US011256302B2

(12) United States Patent
Holung et al.

(10) Patent No.: US 11,256,302 B2
(45) Date of Patent: Feb. 22, 2022

(54) MAGNETIC HINGE ASSEMBLIES

(71) Applicant: Lenovo (Singapore) Pte. Ltd., Singapore (SG)

(72) Inventors: Joseph Anthony Holung, Wake Forest, NC (US); Tin-Lup Wong, Chapel Hill, NC (US); Joseph David Plunkett, Raleigh, NC (US); Ritchie Alan Russ, Raleigh, NC (US); Philip John Jakes, Durham, NC (US); Bouziane Yebka, Apex, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 326 days.

(21) Appl. No.: 15/015,114

(22) Filed: Feb. 3, 2016

(65) Prior Publication Data
US 2017/0220077 A1    Aug. 3, 2017

(51) Int. Cl.
*G06F 1/16*    (2006.01)
(52) U.S. Cl.
CPC .......... *G06F 1/1681* (2013.01); *G06F 1/1616* (2013.01); *E05Y 2900/606* (2013.01)
(58) Field of Classification Search
CPC ....... G06F 1/1681; G06F 1/1616; E05D 5/04; E05D 3/122; E05D 7/12; E05Y 2900/606
See application file for complete search history.

(56) References Cited

U.S. PATENT DOCUMENTS

| | | | | |
|---|---|---|---|---|
| 3,995,209 A * | 11/1976 | Weston | .................... | H03H 7/40 323/355 |
| 5,466,164 A * | 11/1995 | Miyazaki | ........... | H01R 13/4538 439/140 |
| 5,681,176 A * | 10/1997 | Ibaraki | ................. | H01R 35/025 439/165 |
| 5,995,373 A * | 11/1999 | Nagai | ................... | G06F 1/1616 16/223 |
| 6,447,314 B1* | 9/2002 | Kato | ..................... | G06F 1/1616 361/755 |
| 7,097,472 B2* | 8/2006 | Parker | .................... | H01R 24/62 439/131 |
| 7,197,332 B2* | 3/2007 | Andersson | .......... | H04M 1/0218 16/361 |
| 8,348,684 B2* | 1/2013 | Ladouceur | ............ | G06F 1/1656 439/131 |
| 9,190,792 B2* | 11/2015 | Dreisewerd | ............. | E05D 3/186 |
| 9,371,676 B2* | 6/2016 | Rittenhouse | ............ | E05D 11/08 |

(Continued)

OTHER PUBLICATIONS

Gadgetdiary.com, Logitech Ultrathin Keyboard Cover Magnetic Clip, Jan. 2013 (1 page).

(Continued)

*Primary Examiner* — Anthony M Haughton
*Assistant Examiner* — Theron S Milliser
(74) *Attorney, Agent, or Firm* — Brian J. Pangrle

(57) ABSTRACT

An apparatus can include a processor; memory accessible by the processor; a display operatively coupled to the processor; a hinge assembly that includes an axle and leaves where at least one of the leaves includes a leaf magnet that includes north poles and south poles; and a first housing and a second housing that include leaf receptacles that, in a coupled state, receive the leaves of the hinge assembly to pivotably couple the first housing and the second housing.

21 Claims, 25 Drawing Sheets

(56) References Cited

U.S. PATENT DOCUMENTS

| | | | |
|---|---|---|---|
| 9,645,608 B1* | 5/2017 | Tsai | G06F 1/1626 |
| 9,831,621 B2* | 11/2017 | O'Connell | G06F 1/1616 |
| 10,551,881 B2* | 2/2020 | Ho | G06F 1/203 |
| 2002/0051339 A1* | 5/2002 | Ohashi | G06F 1/203 361/679.46 |
| 2008/0184530 A1* | 8/2008 | Chao | E05D 7/1061 16/342 |
| 2009/0244009 A1* | 10/2009 | Staats | G06F 1/162 345/168 |
| 2009/0278642 A1 | 11/2009 | Fullerton et al. | |
| 2010/0123663 A1* | 5/2010 | Leung | G06F 1/1632 345/169 |
| 2010/0238620 A1* | 9/2010 | Fish | G06F 1/1616 361/679.09 |
| 2011/0128216 A1* | 6/2011 | Renwick | G06F 1/1618 345/156 |
| 2012/0113578 A1* | 5/2012 | Holung | G06F 1/162 361/679.07 |
| 2012/0156901 A1* | 6/2012 | Ladouceur | G06F 1/1656 439/77 |
| 2012/0170243 A1* | 7/2012 | Griffin | H04M 1/0216 361/810 |
| 2013/0242495 A1* | 9/2013 | Bathiche | G06F 1/1626 361/679.28 |
| 2013/0346636 A1* | 12/2013 | Bathiche | G06F 13/102 710/8 |
| 2015/0281413 A1* | 10/2015 | Longo | H04M 1/0212 455/575.3 |
| 2016/0349801 A1* | 12/2016 | Liang | G06F 1/1662 |
| 2017/0017273 A1* | 1/2017 | Weldon | G06F 1/1654 |
| 2017/0068282 A1* | 3/2017 | Smith | G06F 1/1669 |
| 2017/0070017 A1* | 3/2017 | O'Connell | G06F 21/31 |
| 2017/0075381 A1* | 3/2017 | Koo | G06F 1/1662 |
| 2017/0145724 A1* | 5/2017 | Siddiqui | E05F 1/1284 |
| 2017/0145725 A1* | 5/2017 | Siddiqui | E05F 3/20 |
| 2017/0153664 A1* | 6/2017 | Tsai | G06F 1/1616 |
| 2017/0153665 A1* | 6/2017 | Tsai | G06F 1/1616 |
| 2018/0267578 A1* | 9/2018 | Ho | G06F 1/1681 |
| 2020/0190877 A1* | 6/2020 | Zhai | G06F 1/1681 |

OTHER PUBLICATIONS

Mechanismsmarket.com, Polymagnet Guide, Jan. 2016 (4 pages).
Liliputing.com, Acer Aspire Switch 10 2-in-1 Windows tablet review, Jul. 2, 2014 (20 pages).
Acer, Aspire Switch 10 User's Manual, May 2014 (76 pages).
Amazingmagnets.com, Item Code: FC20N03-FC-20S03-D125F-PAIR, 2015 (3 pages).
Amazingmagnets.com, Spring Polymagnets, 2015 (3 pages).
Polymagnet.com, Correlated Magnetics Introduces Smart Magnet Kits for Tablet and Mobile Accessories, May 20, 2015 (3 pages).
Marlborohinge.com, Standard Hinge Terminology, Jan. 2016 (3 pages).
Gadgetdiary.com, Logitech Ultrathin Keyboard Cover Review, Jan. 26, 2013 (5 pages).
Amazing Magnets, P125DH, Jan. 18, 2012 (1 page).
Polymagnet, Differentiate Your Product Design with Polymagnets, Aug. 2015 (6 pages).
Polymagnet, Smart Magnets for Smart Product Design, Aug. 2015 (7 pages).
Polymagnet, Smart Magnets for Precision Alignment, Aug. 2015 (10 pages).
Polymagnet, Brant, I., Smart Magnets for Product Design that Surprises the Senses, Whitepaper, Jan. 5, 2016 (13 pages).

* cited by examiner

MAGNETIC HINGE ASSEMBLIES

TECHNICAL FIELD

Subject matter disclosed herein generally relates to technology for hinges, for example, hinge assemblies for computing devices.

BACKGROUND

Various types of computing devices, display devices, computing and display devices, etc. exist where, for example, one device may cooperate with another device or component of an assembly or system. As an example, consider a display in a display housing that cooperates with a keyboard in a keyboard housing, which may, for example, allow for input of information via the display in addition to, or as an alternative to, input of information via the keyboard. In such an example, the keyboard housing and the display housing may connect via a hinge, for example, that allows for pivoting of the housings to achieve a back-to-back orientation of the keyboard housing and the display housing. In such an orientation, the display may be used on one side as a tablet (e.g., consider a scenario where the display is a touchscreen display) while the keyboard faces outwardly from the opposing side.

SUMMARY

An apparatus can include a processor; memory accessible by the processor; a display operatively coupled to the processor; a hinge assembly that includes an axle and leaves where at least one of the leaves includes a leaf magnet that includes north poles and south poles; and a first housing and a second housing that include leaf receptacles that, in a coupled state, receive the leaves of the hinge assembly to pivotably couple the first housing and the second housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, a system may include a display in a display housing that cooperates with a keyboard in a keyboard housing, which may, for example, allow for input of information via the display in addition to, or as an alternative to, input of information via the keyboard. In such an example, the keyboard housing and the display housing may connect via a hinge assembly (e.g., or hinge assemblies) that, for example, allows for pivoting of the housings, for example, to achieve a folded orientation of the keyboard housing and the display housing. As an example, where a display faces outwardly in a folded orientation, the display of the system may be used as a tablet (e.g., consider a scenario where the display is a touchscreen display).

As an example, a system can include multiple housings where at least one of the housings is a display housing. As an example, a system can include two display housings coupled via one or more hinge assemblies where the display housings may be pivotable to a planar orientation and pivotable to a folded orientation, which may be one of a back-to-back, a front-to-back or a front-to-front orientation. As an example, a system can include a plurality of housings where one or more of the housings may be display housings and, for example, where one or more of the housings may be input component housings such as, for example, keyboard housings, touchscreen display housings, etc. In such an example, hinge assemblies can be included, which may optionally allow for decoupling and recoupling of one or more of the housings.

Figure 1:
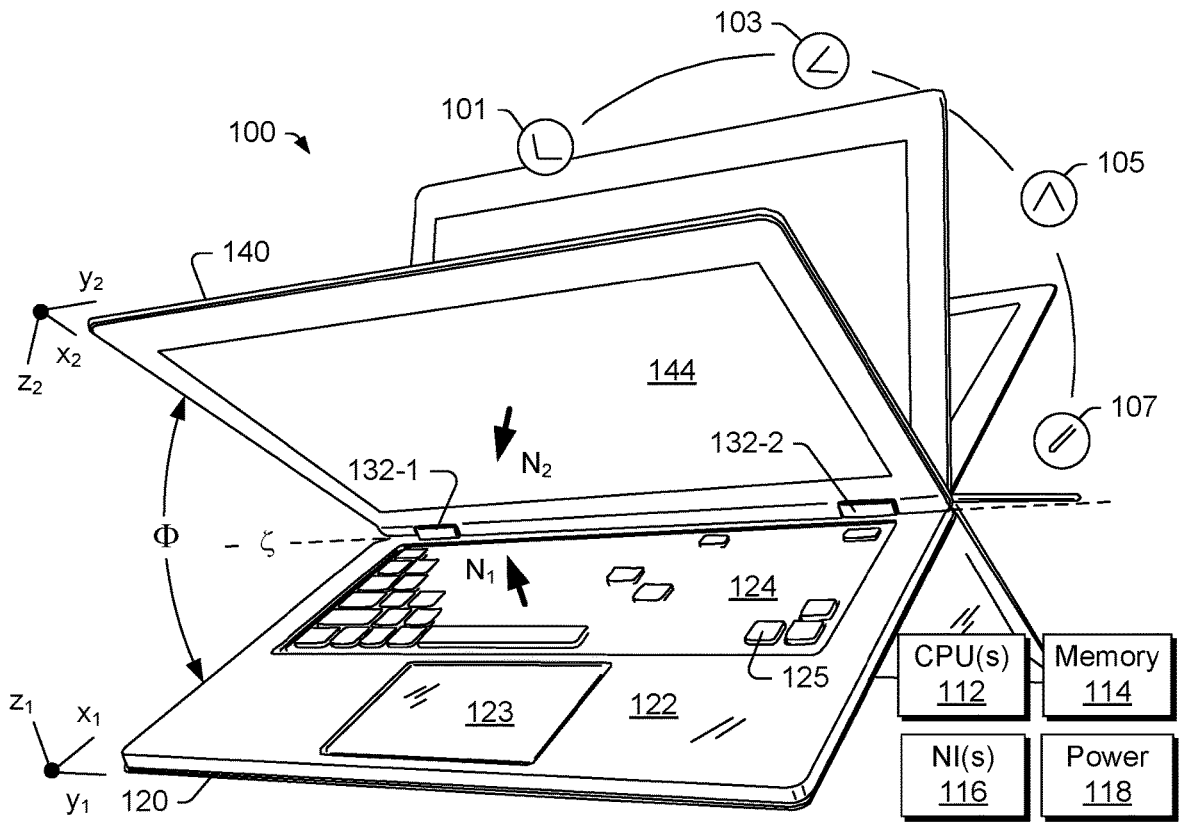
FIG. 1 is a diagram of examples of systems.
Figure 1:
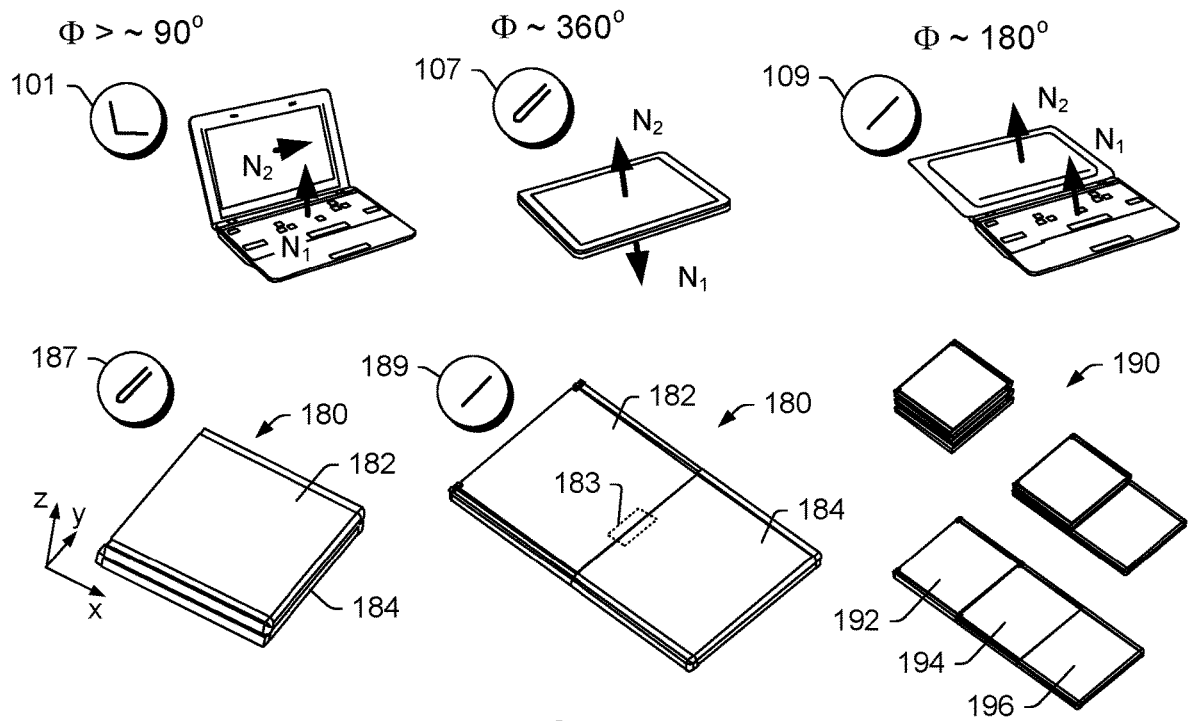

FIG. 1 shows an example of a system 100 that includes a keyboard housing 120 and a display housing 140 that are pivotable with respect to each other via movement about one or more hinges 132-1 and 132-2 (e.g., hinge assemblies). FIG. 1 also shows an example of a system 180 that includes a first housing 182 and a second housing 184 that are pivotable with respect to each other via movement about one or more hinges 183 (e.g., hinge assemblies) and an example of a system 190 that includes a first housing 192, a second housing 194 and a third housing 196 that may be pivotable with respect to each other via movement about hinges.

As an example, the system 100, the system 180 and/or the system 190 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, the housing 182, the housing 184, the housing 182 and the housing 184, one or more of the housings 192, 194 and 196, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

As shown in FIG. 1, the system 180 can include a folded orientation 187 and a planar orientation 189. As an example, one or both of the housings 182 and 184 may include a display. As shown in FIG. 1, the system 190 can include various orientations, including, for example, a planar orientation of the three housings, a partially folded orientation and a folded orientation. As an example, a three housing system may be configurable in more than one folded orientation with respect to a "middle" housing. For example, the housings 192 and 196 may be folded with respect to the housing 194 with the housing 192 on the top side or bottom side or with the housing 196 on the top side or bottom side.

Figure 2:
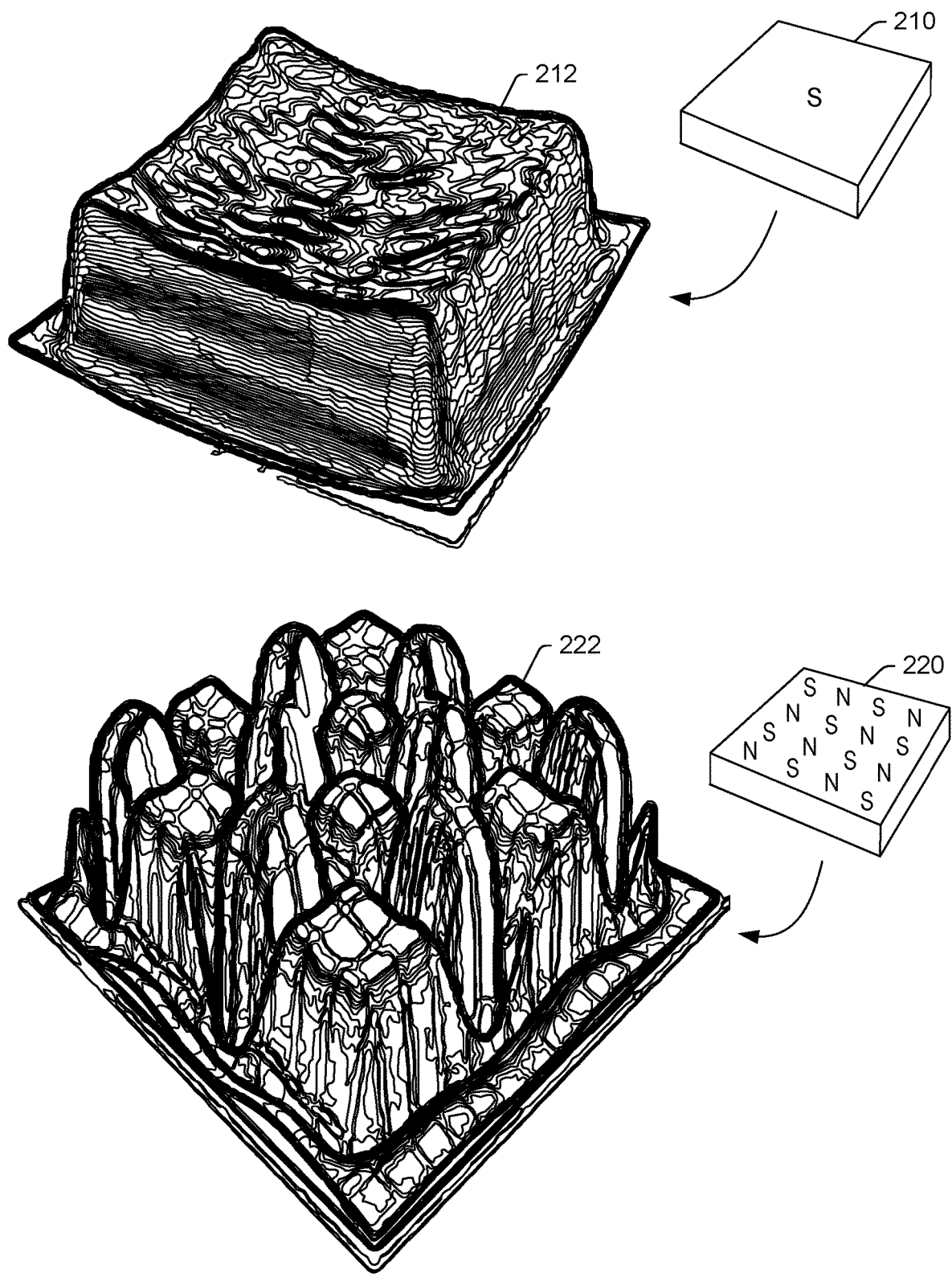
FIG. 2 is a series of plots of magnetic fields associated with a magnet that includes a single north pole and a single south pole and a magnet that includes a plurality of north poles and a plurality of south poles.

FIG. 2 shows an example of a magnet 210 with a single north pole and a single south pole and an example of a magnet 220 with a plurality of north poles and a plurality of south poles. FIG. 2 also shows approximate three-dimensional field plots 212 and 222 for the magnets 210 and 220, respectively. In the plot 222, the field varies in a manner that corresponds to the arrangement of the plurality of north poles and the plurality of south poles of the magnet 220.

As an example, a plurality of north poles and a plurality of south poles may define an array of poles. As an example, each element in an array of poles may be referred to as a field emission source where an array includes a plurality of field emission sources.

As an example, an array of field emission sources can be one of a one-dimensional array, a two-dimensional array, or a three-dimensional array. The polarities of the field emission sources can be at least one of north-south polarities or positive-negative polarities.

As an example, at least one of the field emission sources can be a magnetic field emission source and/or an electric field emission source. For example, in an array, at least one of the field emission sources can be a permanent magnet, an electromagnet, an electro-permanent magnet, an electret, a magnetized ferromagnetic material, a portion of a magnetized ferromagnetic material, a soft magnetic material, or a superconductive magnetic material.

As an example, at least one of a first field emission structure and a second field emission structure can be at least one of a back keeper layer, a front saturable layer, an active intermediate element, a passive intermediate element, a lever, a latch, a swivel, a heat source, a heat sink, an inductive loop, a plating nichrome wire, an embedded wire, or a kill mechanism. As an example, at least one of a first field emission structure and a second field emission structure can be a planer structure, a conical structure, a cylindrical structure, a curved surface, or a stepped surface.

As an example, a method may be implemented for producing one or more magnetic field emission structures. As an example, a first magnetic field emission structure can include an array of individual magnets, for example, below a ferromagnetic material (e.g., consider iron) that is to become a second magnetic field emission structure. In such an example, the second magnetic field emission structure can include the same coding as the first magnetic field emission structure.

As an example, consider a method where ferromagnetic material is heated to at least its Curie temperature (for antiferromagnetic materials this would instead be the Neel temperature) and then brought in contact with a first magnetic field emission structure and allowed to cool. Thereafter, the ferromagnetic material takes on substantially the same magnetic field emission structure properties of the first magnetic field emission structure and becomes a magnetized ferromagnetic material, which is itself a magnetic field emission structure. As an example, where another ferromagnetic material is heated to at least its Curie temperature and then brought in contact with the magnetized ferromagnetic material, it too can take on substantially the same magnetic field emission structure properties of the magnetized ferromagnetic material.

As an example, a method of making a magnetic field emission structure from a ferromagnetic material can include using one or more lasers to selectively heat up field emission source locations on the ferromagnetic material to at least its Curie temperature and then subject the locations to a magnetic field (e.g., or fields). In such an approach, the magnetic field to which a heated field emission source location may be subjected may have a substantially constant polarity or, for example, have a polarity varied in time so as to code the respective source locations as they are heated and cooled.

As an example, a method can include adding one or more intermediate layers to a magnetic field emission structure. For example, consider a method where each intermediate layer is intended to smooth out (e.g., or suppress) spatial forces when any two magnetic field emission structures are brought together such that sidelobe effects are substantially shielded. As an example, an intermediate layer can be active (e.g., saturable such as iron) or inactive (e.g., air or plastic).

As an example, a magnetic field emission structure can include a heat sink material and/or an embedded kill mechanism, which may include, for example, an embedded wire (e.g., nichrome) coil that includes connector leads. In such an example, where heat is applied from outside the magnetic field emission structure, the heat sink material can help to avoid magnets of the magnetic field emission structure from reaching their Curie temperature. However, where it is desirable to kill at least a portion of the magnetic field emitted by the magnetic field emission structure, a current can be applied to connector leads to cause the wire coil to heat up to the Curie temperature. As an example, an electromagnetic field may be generated by a coil that may alter a magnetic field of a magnetic field emission structure. As an example, a method can include embedding a wire coil (e.g., a nichrome wire or wires) into one or more magnetic field structures and/or plating one or more wires onto one or more magnetic field structures.

Various different combinations of magnets, optionally having different strengths, can be oriented in various ways to achieve desired spatial forces as a function of orientation and separation distance, for example, between two magnetic field emission structures. For example, a similar aligned attract-repel equilibrium might be achieved by grouping a sparse array of larger magnets tightly together in a center of a magnetic field emission structure. As an example, combinations of correlated and non-correlated magnets may be used together, for example, where weaker magnets may be uncorrelated magnets. As an example, an equilibrium approach may enable relatively frictionless traction (e.g., or hold) forces to be maintained.

As an example, a method can include using one or more vacuum tweezers for placing magnets having first and second polarities into machined holes in a support frame, for example, in accordance with a desired code. As an example, magnets may be held in place in a support frame using an adhesive (e.g., a glue). As an example, holes and magnets may include threads whereby vacuum tweezers or another type of tool may be utilized to screw them into place.

As an example, to generate one or more magnetic fields a current can be applied to an inductive element that may include a coil or a discontinuity on a conductive sheet or conductive plate. As an example, a coil may be operatively coupled to a core that may be a material having a high permeability such as Mu-metal, permalloy, electrical steel, or METGLAS™ magnetic alloy (e.g., an amorphous metal alloy ribbon produced via a rapid solidification process marketed by Metglas, Inc., Conway, S.C.)

Figure 3:
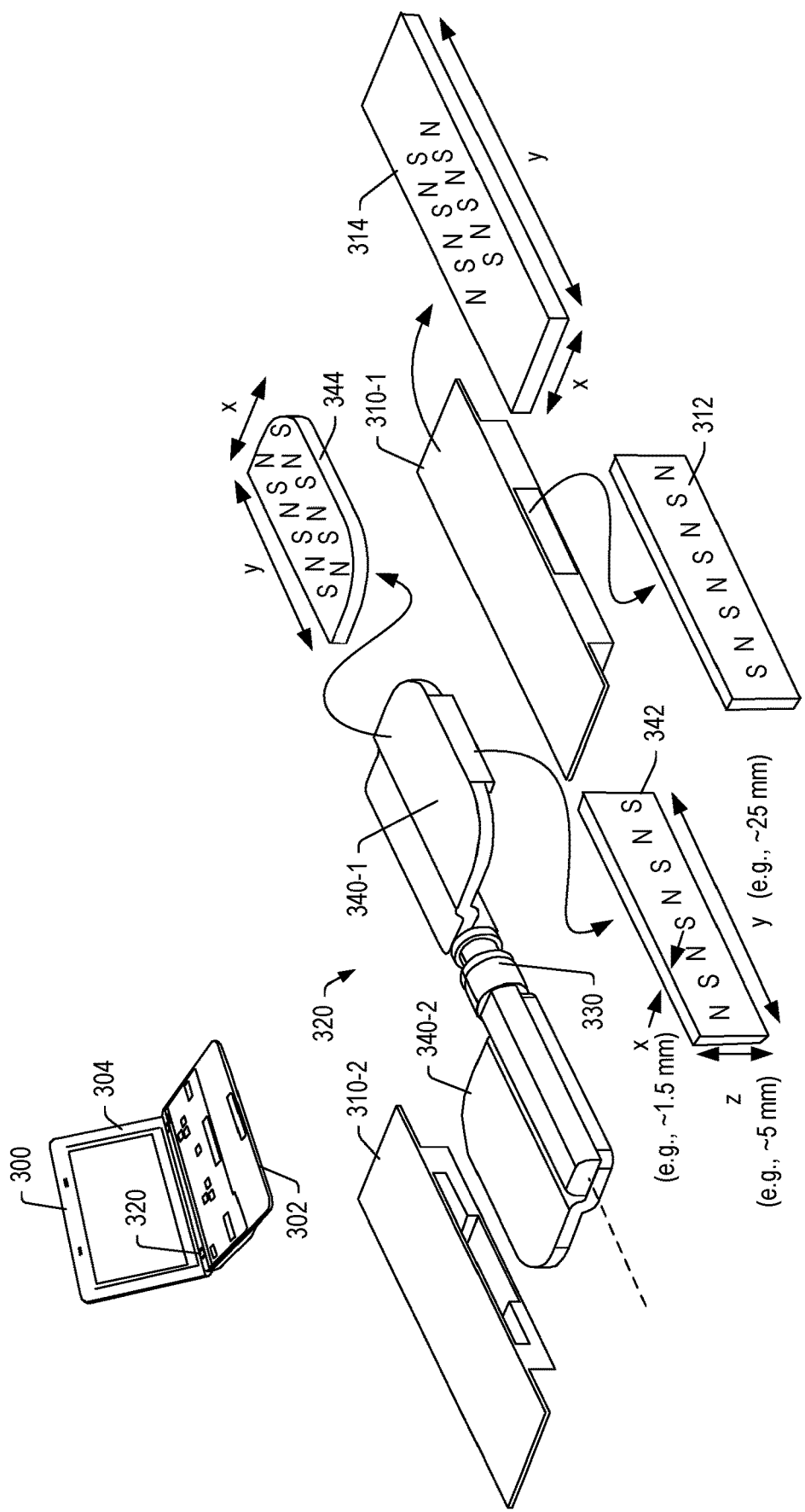
FIG. 3 is a diagram of an example of a system with an example of a hinge assembly.

FIG. 3 shows an example of a device 300 that includes a first housing 302, a second housing 304 and a hinge assembly 320 that operatively couples the first housing 302 and the second housing 304. As an example, the hinge assembly 320 may be held in place via magnets and/or electro-magnets. For example, the hinge assembly 320 may be operatively coupled to the first housing 302 via at least one magnet that includes a plurality of north poles and a plurality of south poles and/or the hinge assembly 320 may be operatively coupled to the second housing 304 via at least one magnet that includes a plurality of north poles and a plurality of south poles.

As an example, the first housing 302 may be a computing device and/or the second housing 304 may be a computing device. For example, the first housing 302 and/or the second housing 304 may include a processor and memory operatively coupled to the processor.

As an example, the hinge assembly 320 may include conductors that can conduct electricity. For example, where one of the housings includes a processor, such conductors may allow for electrically coupling circuitry of the other of the housings to the processor. As an example, consider a keyboard carried by the first housing 302 where the second housing 304 includes a processor that can be operatively coupled to the keyboard via one or more conductors included in the hinge assembly 320. As an example, two housings can include a first housing with a first processor and a second housing with a second processor. In such an example, a hinge assembly can include connectors that can connect to a connector of the first housing and a connector of the second housing, for example, for transmission of power, information or power and information.

As an example, a hinge assembly may provide for transmission of power (e.g., from one or more power sources). As an example, a hinge assembly may provide for transmission of information. In such an example, the hinge assembly may include an optical medium such as, for example, one or more optical fibers. As an example, a hinge assembly may include one or more electrical conductors and/or one or more antennas that may provide for transmission of information (e.g., between the first and second housings, etc.). For example, consider a leaf that includes an antenna and a receptacle that includes an antenna or is proximate to an antenna where information can be transmitted and received via the antennas. As an example, power may be transmitted via antennas. For example, a capacitor or other energy storage component can be operatively coupled to an antenna such that energy received via the antenna can be stored to the capacitor or other energy storage component. As an example, magnets can create an inter-magnet gap, which may be, for example, an air gap where electromagnetic energy may be transferred between antennas.

In the example of FIG. 3, the first housing 302 can include a receptacle 310-1 and the second housing 304 can include a receptacle 310-2. As shown, one or both of these receptacles 310-1 and 310-2 may include a magnet that includes a plurality of north poles and a plurality of south poles. For example, a magnet 312 can include a linear array (e.g., 1D array) of poles while a magnet 314 can include a multidimensional array (e.g., 2D array) of poles. As an example, where a receptacle includes at least one magnet, a leaf of a hinge assembly may include a ferromagnetic material that may optionally include one or more permanent magnets. As an example, where a receptacle includes at least one magnet, a leaf of a hinge assembly may include a metal (e.g., or alloy) that is attracted to a magnet or magnets of a receptacle.

In the example of FIG. 3, the hinge assembly 320 is illustrated as a barrel hinge that includes a barrel 330 and axially offset leafs 340-1 and 340-2. As shown, one or both of these leaves 340-1 and 340-2 may include a magnet that includes a plurality of north poles and a plurality of south poles. For example, a magnet 342 can include a linear array (e.g., 1D array) of poles while a magnet 344 can include a multidimensional array (e.g., 2D array) of poles. As an example, where a leaf includes at least one magnet, a receptacle of a housing may include a ferromagnetic material that may optionally include one or more permanent magnets. As an example, where a leaf includes at least one magnet, a receptacle of a housing may include a metal (e.g., or alloy) that is attracted to a magnet or magnets of a leaf.

FIG. 3 shows some examples of physical dimensions as to a magnet. For example, consider a magnet that has a length of about 25 mm, a width of about 5 mm and a thickness of about 1.5 mm. Such a magnet can include a plurality of north poles and a plurality of south poles. Such a magnet may exhibit an attractive force of the order of lbf (e.g., or N) at a distance of less than about 1 mm. For example, consider a housing that has a weight of about 1 lbf (e.g., about 4.4 N) where a magnet has an attractive force at least about 1 lbf (e.g., about 4.4 N), for example, of at least about 2 lbf (e.g., about 8.9 N) or at least about 3 lbf (e.g., about 13.3 N). In such an example, a single magnet may be sufficient to overcome the weight of the housing such that when the housing and a hinge assembly are oriented with respect to gravity accelerating the housing away from the hinge assembly, the magnet's attractive force overcomes gravity and maintains the housing operatively coupled to the hinge assembly. As an example, where a device includes more than one hinge assembly or, for example, more than one leaf per housing, a desired amount of attractive force may be obtained by distributing magnets at multiple leafs. In such an example, the size of a magnet may be reduced as associated with each leaf compared to a single leaf approach.

Figure 4:
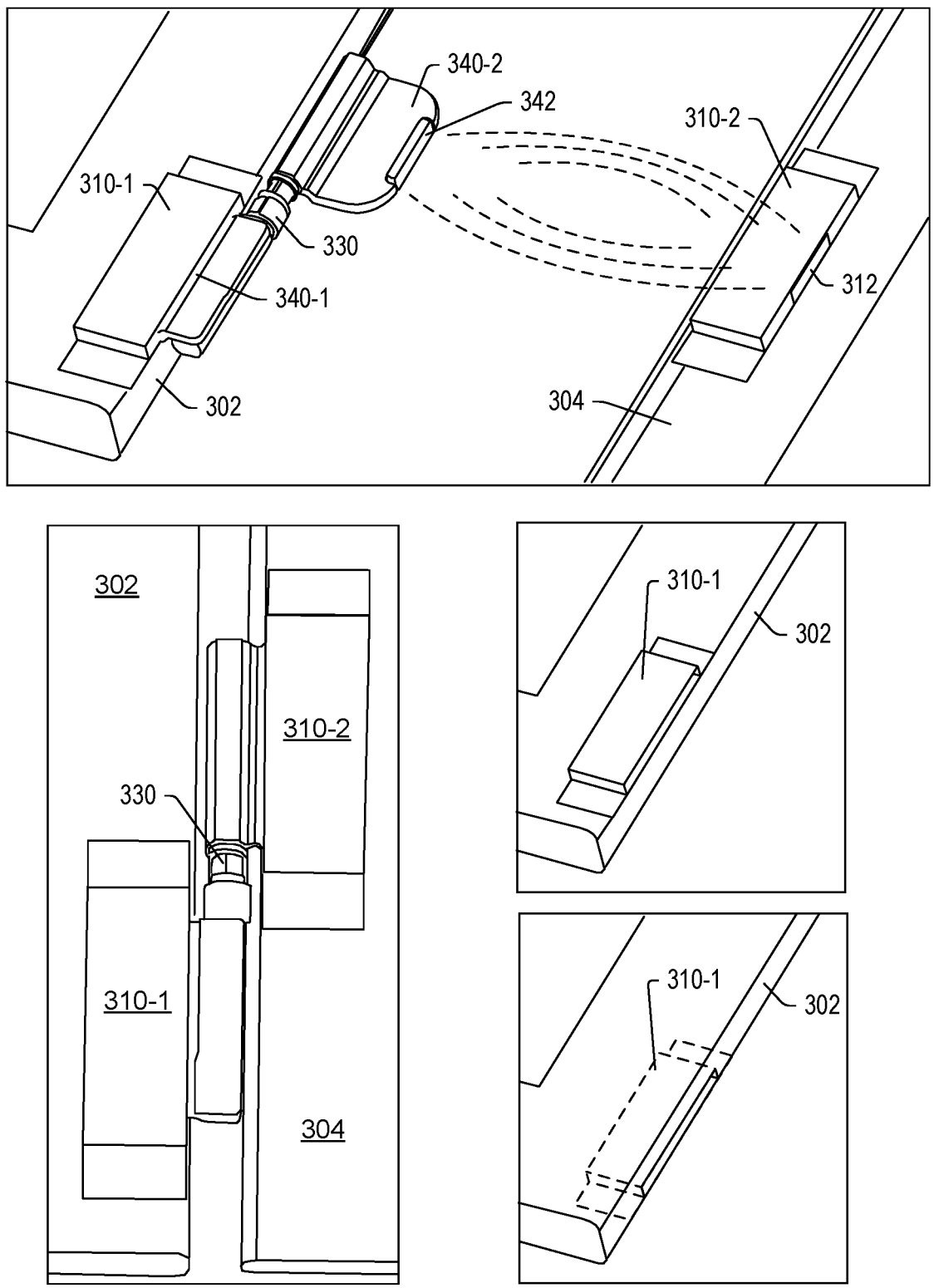
FIG. 4 is a diagram of the system of FIG. 3.

FIG. 4 shows an example of a partially coupled state of the device 300 of FIG. 3 and an example of a coupled state of the device 300 of FIG. 3. In the examples of FIG. 4, the receptacle 310-2 of the housing 304 includes a magnet 312 and the leaf 340-2 includes a magnet 342. The magnets 312 and 342 can each include a plurality of north poles and a plurality of south poles where the magnets at least in part attract.

As an example, with reference to FIG. 4, the magnets 312 and 342 may be spring magnet pairs where they attract until reaching a distance where if brought closer together than that distance, they repel. In such an example, a gap may exist between the magnets 312 and 342 such that the magnets 312 and 342 do not contact each other.

As an example, with reference to FIG. 4, the magnets 312 and 342 may be aligned magnet pairs where if displaced in a particular plane, they attract until reaching a predetermined alignment. In such an example, the magnets 312 and 342 may optionally further be or include spring magnets. As an example, a device can include a combination of spring and alignment magnets.

As shown in FIG. 4, the receptacle 310-1 of the housing 302 and/or the receptacle 310-2 of the housing 304 can be raised, for example, with respect to an exterior a surface of a housing, recessed within a housing, partially raised, partially recessed, etc. As an example, a receptacle may be movable, for example, movable responsive to the presence of a magnetic field. For example, a leaf can include a magnet or magnets that cause a receptacle to move once the leaf is brought into proximity to the receptacle. Such movement of a receptacle may be via magnetic attraction, magnetic repulsion, magnetic attraction and magnetic repulsion. As an example, a receptacle can be operatively coupled to one or more springs and/or one or more other types of elements (e.g., viscous elements, etc.).

Figure 5:
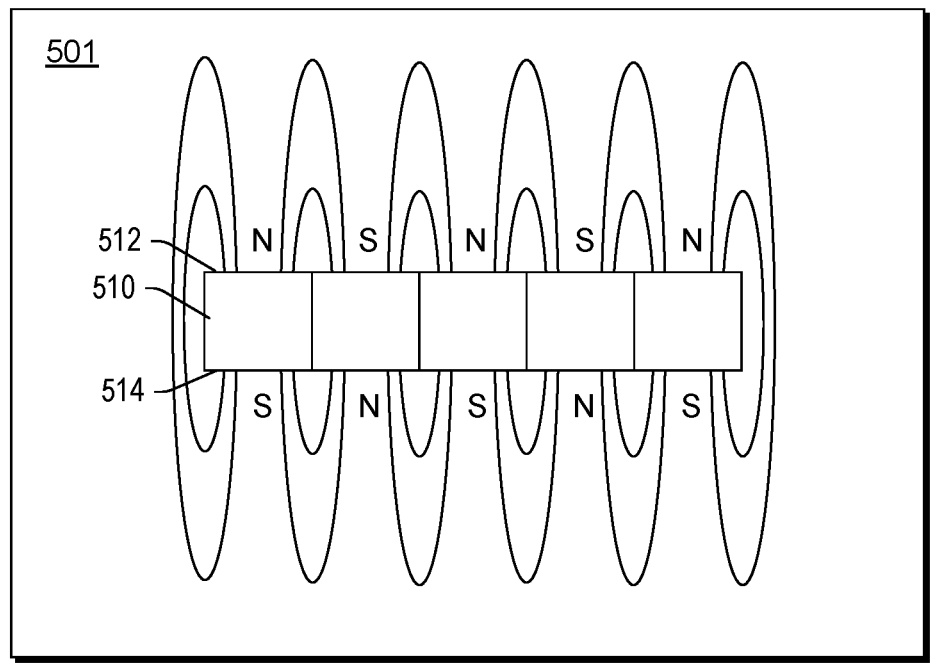
FIG. 5 is a series of diagrams of an example of a magnet.
Figure 5:
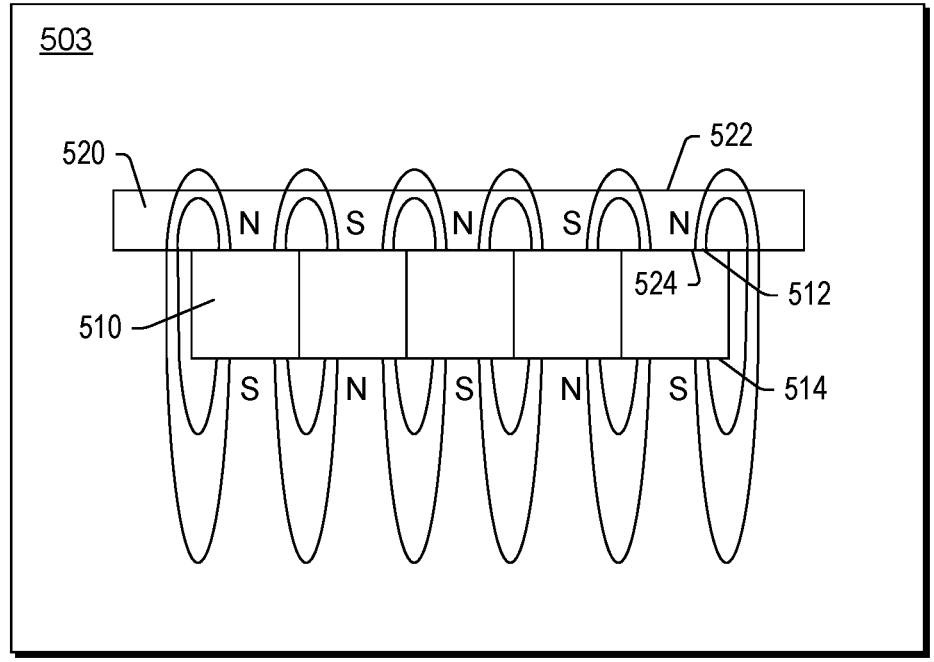

FIG. 5 shows example states 501 and 503 of an example of a magnet 510 that includes five north poles and five south poles. In the state 501, the magnet 510 has a field that extends in a direction substantially normal to an upper surface 512 and that extends in an opposing direction substantially normal to a lower surface 514. In the state 503, ferromagnetic material 520 is shown, which includes an upper surface 522 and an opposing lower surface 524, where the lower surface 524 is adjacent to the upper surface 512 of the magnet 510.

As an example, the ferromagnetic material 520 may be unmagnetized ferromagnetic material prior to being subjected to the field of the magnet 510. As an example, the ferromagnetic material 520 may be magnetized ferromagnetic material, for example, consider a permanent magnet where orientation thereof would result in either attraction or repulsion (e.g., depending on respective field orientations, distance, etc.).

As an example, velocity of material can have an effect on behavior. For example, consider an object being accelerated into a bore of a coil where flux linkage may increase, generating an induced voltage in the coil that can opposes a supply voltage. Such a mechanism can act to reduce current in the coil and the magnetic field which, in turn, can induce a voltage that tries to maintain the current of the coil. Speed of an object can affect this mechanism, for example, a slower speed of the object may have a lesser effect on current in a coil compared to a faster speed of the object. While a coil is mentioned, such effects can be present for permanent magnets, for example, consider accelerating a plate of aluminum in a field gradient of a permanent magnet where eddy currents can be generated in the plate of aluminum that will act to oppose the field of the permanent magnet, thus, requiring greater force to move the plate of aluminum. Factors such as magnet field distribution, geometry/shape of an object, etc. can affect dynamic behavior.

As an example, in an unmagnetized ferromagnetic material, tiny current loops can be organized into small groups called domains. These domains may be orientated in random directions so that macroscopically, the material exhibits no magnetization. When an external field is applied, the loops within the domains can experience a torque force which tries to align them with the field. This means that domains which are originally more aligned with the field tend to grow at the expense of the less well aligned domains such that the better aligned domains "hijack" loops from the surrounding less well aligned ones. The stronger the external field becomes, the more fully aligned the loops become. Saturation of an object may be considered analogous to a loop reaching a maximum current.

As an example, an object may be modeled as a single "large" dipole (e.g., as a sum of many individual dipoles) that has its maximum pole strength determined by its saturation magnetization. As a field tends to be stronger towards its center, an induced front pole of an object experiences an attractive force which is stronger than the repulsive force generated by a rear pole of the object, resulting in a net attraction.

Referring again to the state 503 of FIG. 5, the ferromagnetic material 520 is shown as being "attracted" to the field of the magnet 510. In other words, the field of the magnet 510 acts to align domains of the ferromagnetic material 520, which results in an attraction force.

Figure 6:
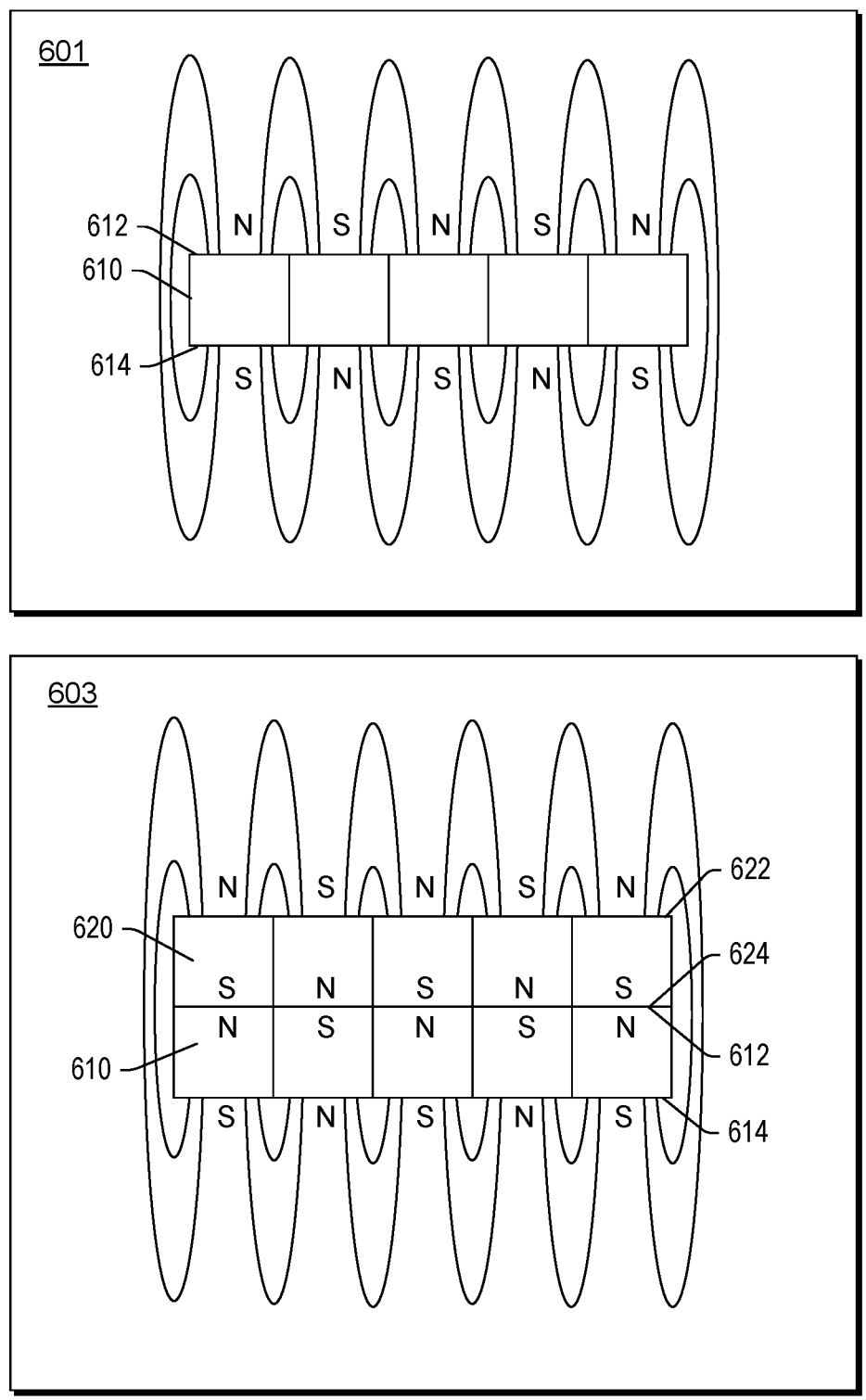
FIG. 6 is a series of diagrams of examples of magnets.

FIG. 6 shows example states 601 and 603 of an example of a magnet 610 that includes five north poles and five south poles and a magnet 620 that includes five north poles and five south poles. In the state 601, the magnet 610 has a field that extends in a direction substantially normal to an upper surface 612 and that extends in an opposing direction substantially normal to a lower surface 614. In the state 603, the magnet 620 has a field that extends in a direction substantially normal to an upper surface 622 and that extends in an opposing direction substantially normal to a lower surface 624 where the lower surface 624 is adjacent to the upper surface 612 of the magnet 610. In such an example, the fields of the magnets 610 and 620 generate an attraction force. Such an arrangement can generate an attraction force that is greater than a scenario where an initially unmagnetized ferromagnetic material is brought in proximity with the magnet 610 (e.g., placed adjacent to the magnet 610).

As an example, where a receptacle includes a magnet and where a leaf of a hinge assembly includes a magnet, the size of the magnets may be reduced to achieve a desired force when compared to a scenario where either the receptacle or the leaf includes a magnet while the leaf or the receptacle includes unmagnetized ferromagnetic material (e.g., iron, etc.). Such an approach may allow for a reduction in hinge size. For example, a leaf and a receptacle may be sized smaller where each includes at least one magnet and where such magnets are oriented to provide an attraction force.

Figure 7:
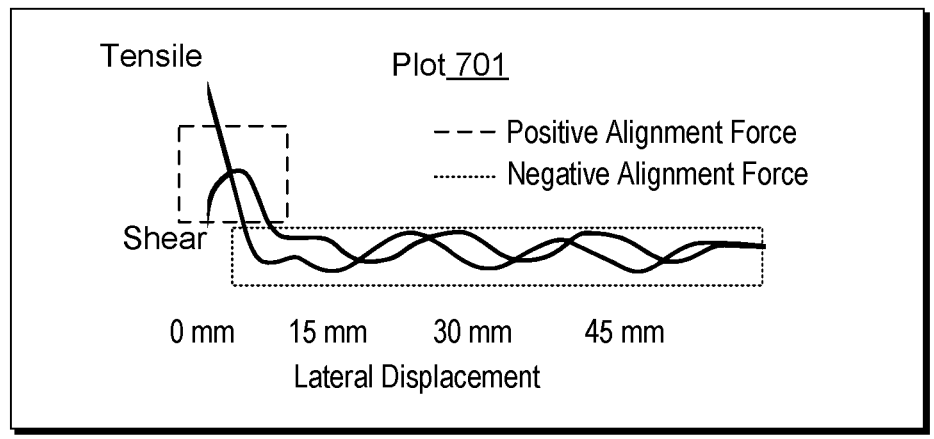
FIG. 7 is a series of diagrams of a plot and examples of magnets.
Figure 7:
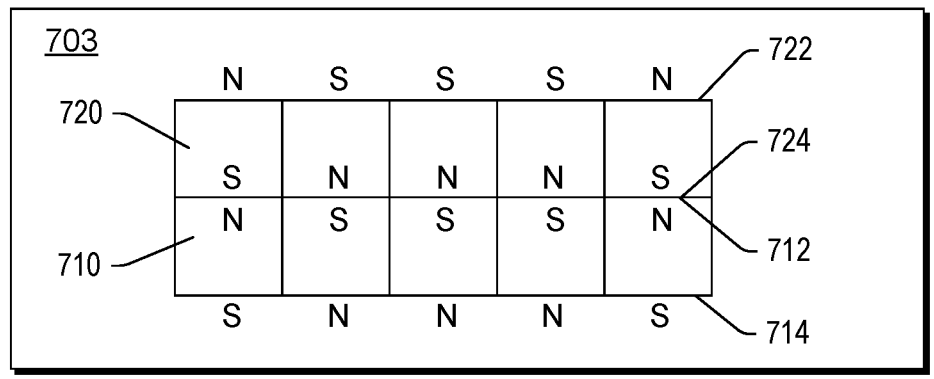
Figure 7:
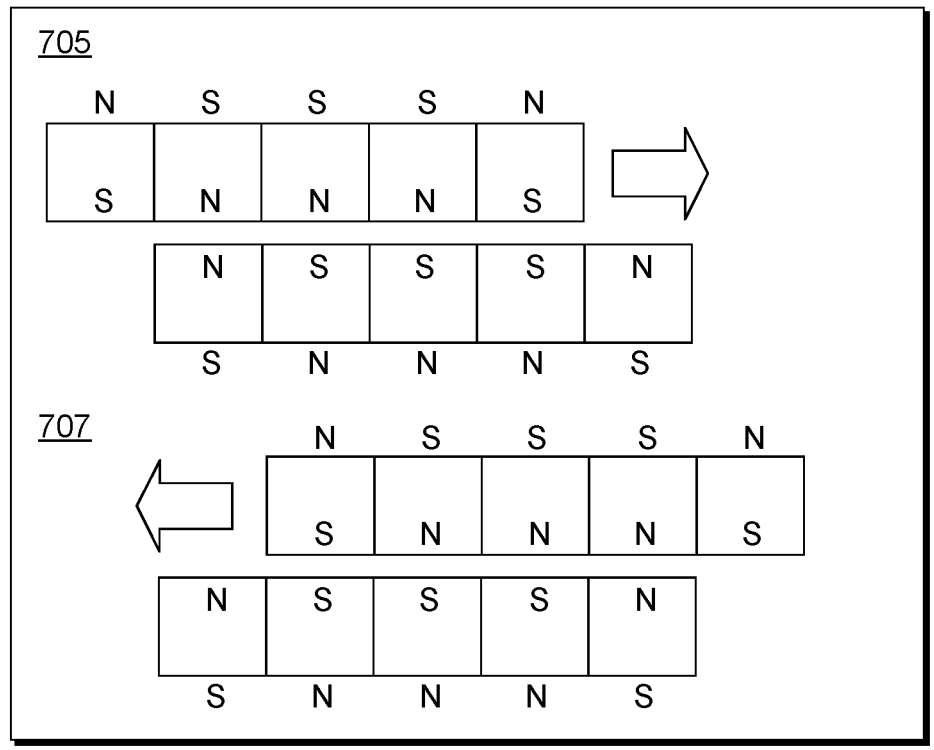

FIG. 7 shows an example of a plot 701 and example states 703, 705 and 707. In FIG. 7, the plot 701 shows magnet-to-magnet forces versus offset in a linear position at a fixed magnet-to-magnet distance of about 1.5 mm where the magnets may include poles arranged as in the magnets 610 and 620 of FIG. 6. As an example, tensile force may be considered to be a holding force while shear force may be considered to be an alignment force. The plot 701 shows that the alignment force is greatest at a relatively low offset. As an example, an alignment force may exhibit maxima about a substantially zero offset. For example, when perfectly aligned, due to a region of relative homogeneity of fields, some small amount of displacement may occur without a substantial increase in alignment force; however, displacement beyond that small amount (e.g., in one or more directions) will cause an increase in the alignment force that may act to maintain alignment.

As an example, magnets can include an arrangement of poles that may differ from the arrangements of poles of the magnets 610 and 620. As shown in FIG. 7, the magnet 710 includes five north poles and five south poles and the magnet 720 includes five north poles and five south poles where the arrangement of the poles differs from the arrangements of the poles in the magnets 610 and 620 of FIG. 6. Specifically, the poles are arranged with common end poles and differing interior poles. The example states 703, 705 and 707 indicate how poles may be paired when aligned as in the state 703 and when displaced as in the states 705 and 707.

Figure 8:
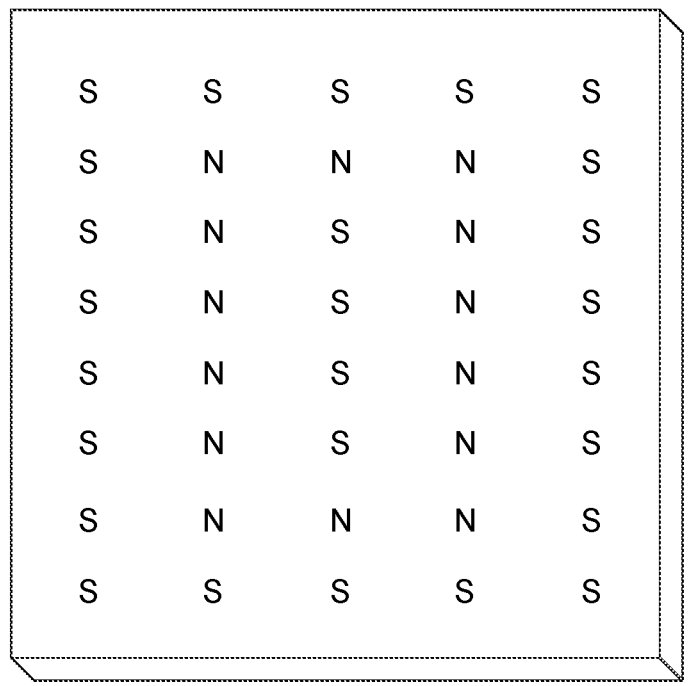
FIG. 8 is a diagram of an example of a magnet.

FIG. 8 shows an example of a 2D arrangement of poles of a magnet 800. In such an example, rings of poles exist when may act to center a magnet with respect to the magnet 800. For example, consider matching opposing poles that are attracted to corresponding poles of the magnet 800 such that displacement in a plane parallel to the plane shown in FIG. 8 causes an alignment force to help maintain alignment of the magnets. In such an example, rotation of one magnet with respect to the other may be relatively unopposed whereas translation is opposed. As an example, a leaf and a receptacle can include rings of poles (e.g., boxes of poles). In such an example, once the leaf and the receptacle are brought into substantial alignment, magnetic forces may act upon the leaf and the receptacle to help maintain alignment. As an example, such an approach may optionally be used with one or more other magnets including, for example, one or more linear array magnets.

Figure 9:
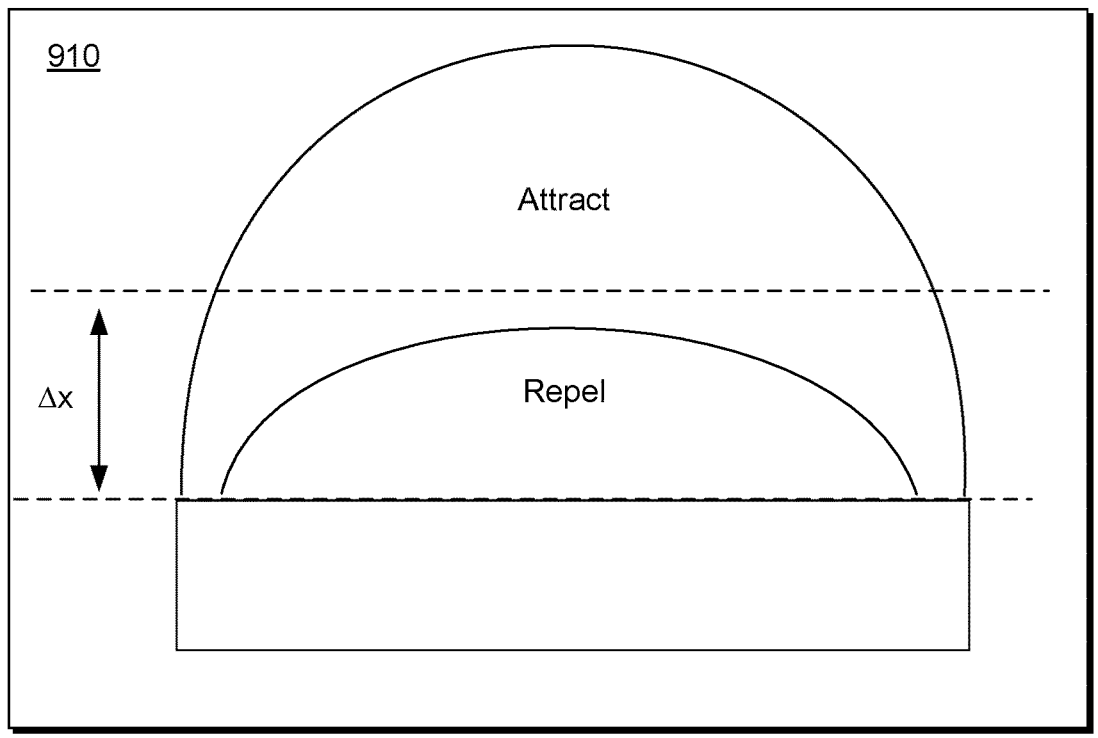
FIG. 9 is a series of diagrams of an example of a magnetic spring and an example of a plot of forces corresponding to a magnetic spring.
Figure 9:
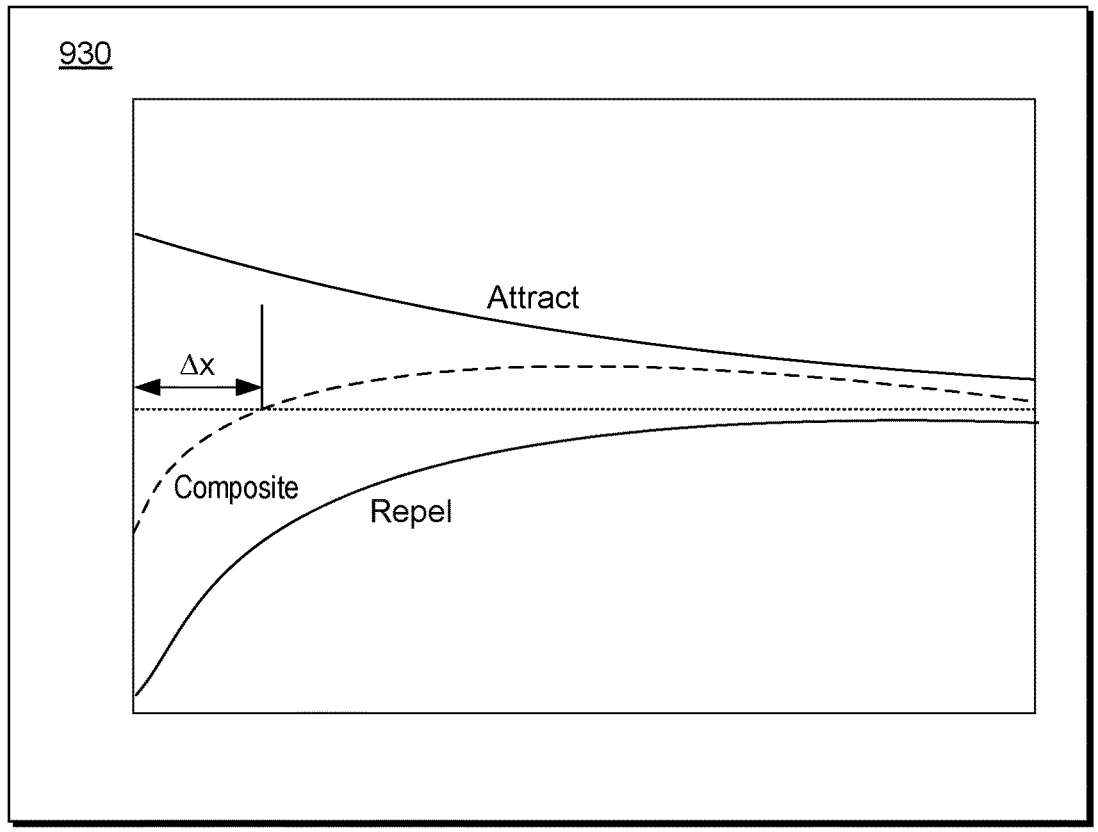

FIG. 9 shows an example of behavior of a magnetic spring via a graphic 910 and a plot 930. As shown in the graphic 910, a region can exist where weak attraction can occur and another region can exist where strong repulsion can occur. As illustrated in the plot 930, attraction force and repulsion force define a composite force where a balance can exist at, for example, a zero crossing. In the graphic 910 and the plot 930, the balance exists for a corresponding magnet-to-magnet distance or spacing, denoted $\Delta x$ (e.g., noting that with respect to FIG. 1, such a distance may be in an appropriate direction with respect to a housing, etc.). As an example, a leaf and a receptacle may include one or more magnets such that a spring magnet is formed. In such an example, a balance distance may exist where attraction and repulsion forces substantially cancel. Upon displacement away from a magnet, an attraction force may draw an object back towards the magnet; whereas, upon displacement toward the magnet, a repulsion force may urge the object away from the magnet. Such behavior may be considered to be associated with a spring like magnetic field.

Figure 10:
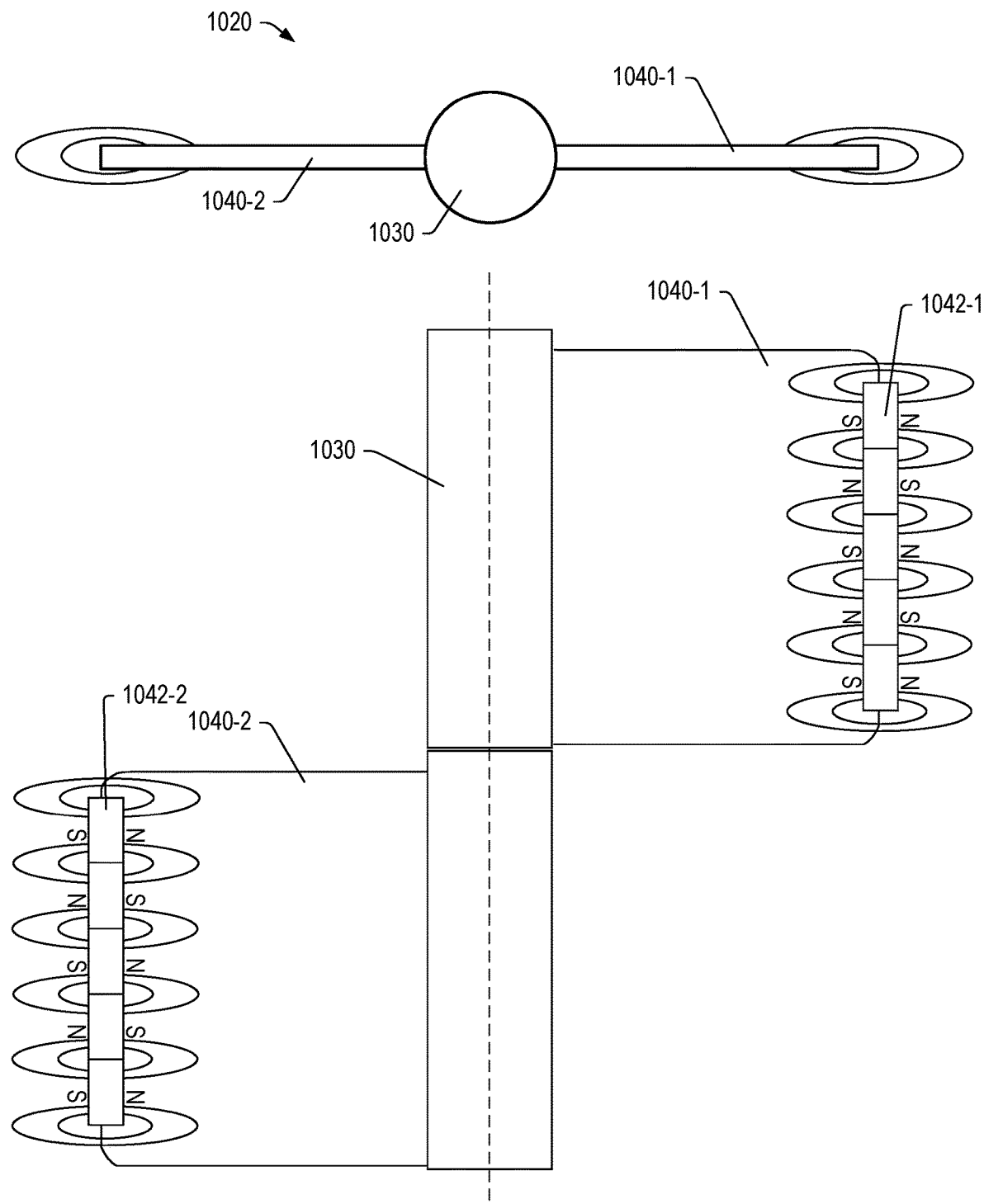
FIG. 10 is a diagram of an example of a hinge assembly.

FIG. 10 shows an example of a hinge assembly 1030 that includes a barrel 1030 and leaves 1040-1 and 1040-2 that extend radially outwardly from an axis of the barrel 1030. In the example of FIG. 10, each of the leaves 1040-1 and 1040-2 includes a magnet 1042-1 and 1042-2, respectively. As illustrated in FIG. 10, fields emanate from the magnets 1042-1 and 1042-2 at least in part in a plane of their respective leaves 1040-1 and 1040-2. As an example, a receptacle can include a ferromagnetic material that can be attracted to one or both of the magnets 1042-1 and/or 1042-2.

Figure 11:
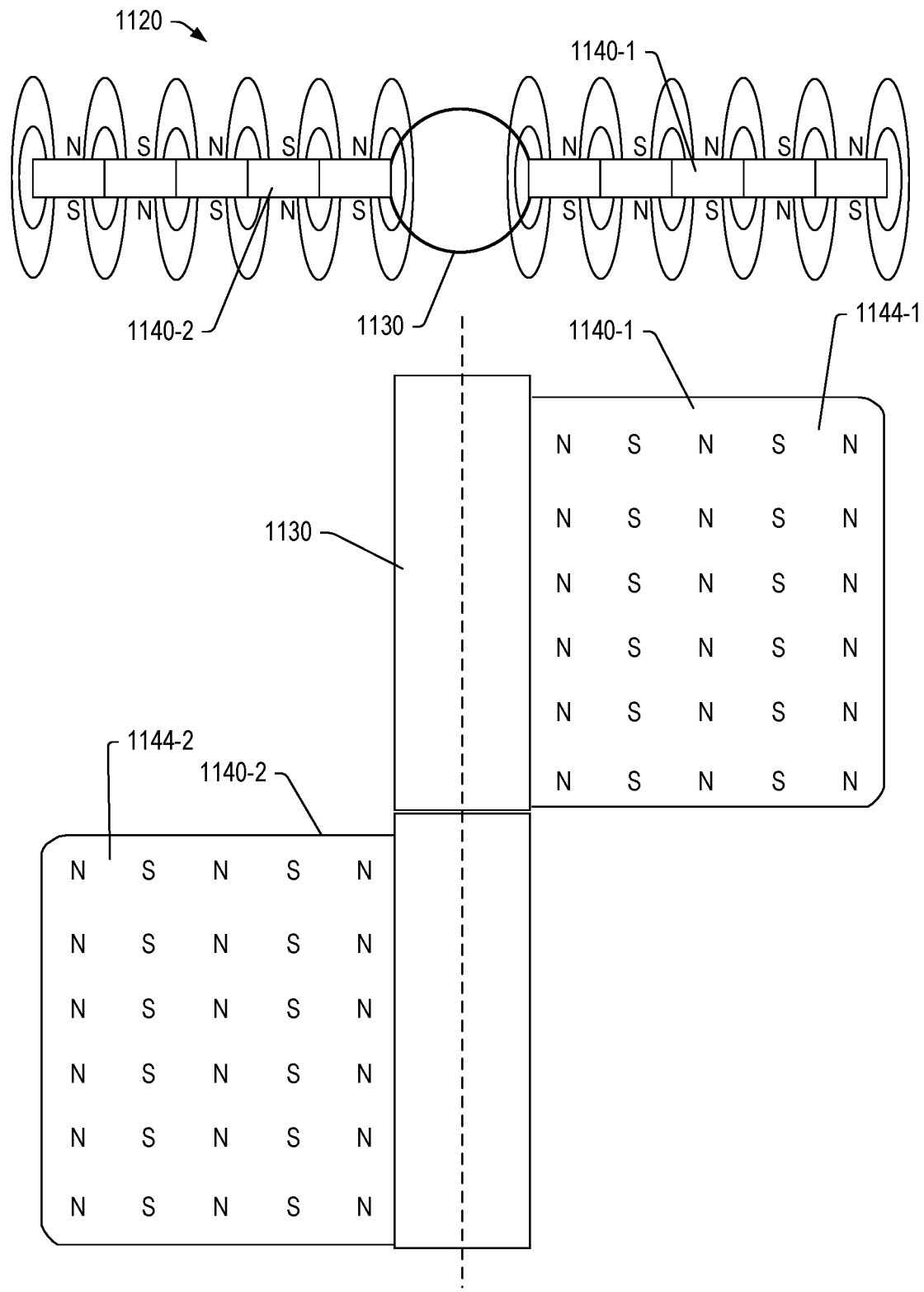
FIG. 11 is a diagram of an example of a hinge assembly.

FIG. 11 shows an example of a hinge assembly 1130 that includes a barrel 1130 and leaves 1140-1 and 1140-2 that extend radially outwardly from an axis of the barrel 1130. In the example of FIG. 11, each of the leaves 1140-1 and 1140-2 includes a magnet 1144-1 and 1144-2, respectively. As illustrated in FIG. 11, fields emanate from the magnets 1144-1 and 1144-2 at least in part perpendicular to a plane of their respective leaves 1140-1 and 1140-2. As an example, a receptacle can include a ferromagnetic material that can be attracted to one or both of the magnets 1144-1 and/or 1144-2.

Figure 12:
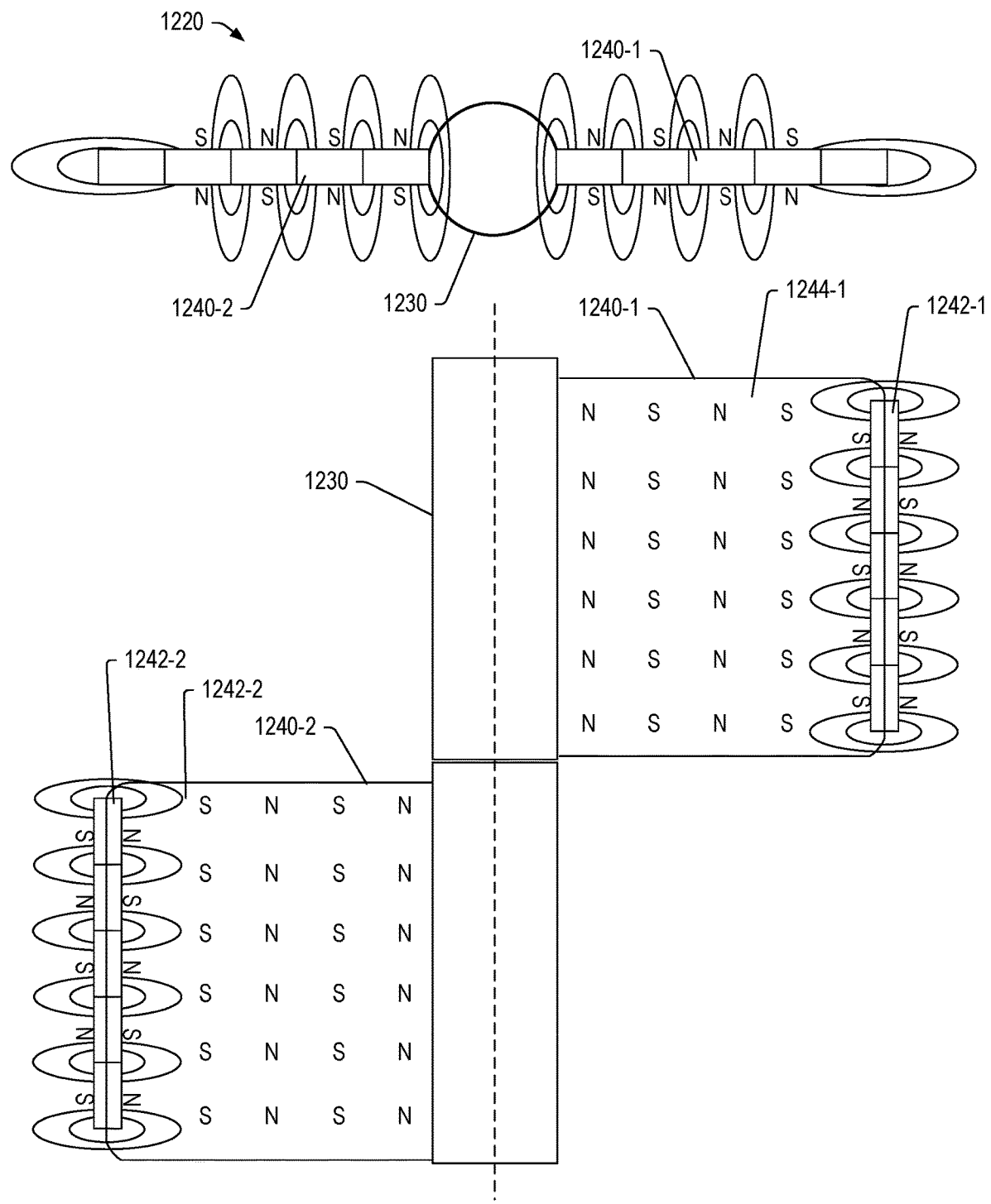
FIG. 12 is a diagram of an example of a hinge assembly.

FIG. 12 shows an example of a hinge assembly 1230 that includes a barrel 1230 and leaves 1240-1 and 1240-2 that extend radially outwardly from an axis of the barrel 1230. In the example of FIG. 12, each of the leaves 1240-1 and 1240-2 includes a magnet 1242-1 and 1242-2, respectively, and a magnet 1244-1 and 1244-2, respectively. As illustrated in FIG. 12, fields emanate from the magnets 1242-1 and 1242-2 at least in part in a plane of their respective leaves 1240-1 and 1240-2 and fields emanate from the magnets 1244-1 and 1244-2 at least in part perpendicular to a plane of their respective leaves 1240-1 and 1240-2. As an example, a receptacle can include a ferromagnetic material that can be attracted to one or more of the magnets 1242-1, 1242-2, 1244-1 and/or 1244-2.

Figure 13:
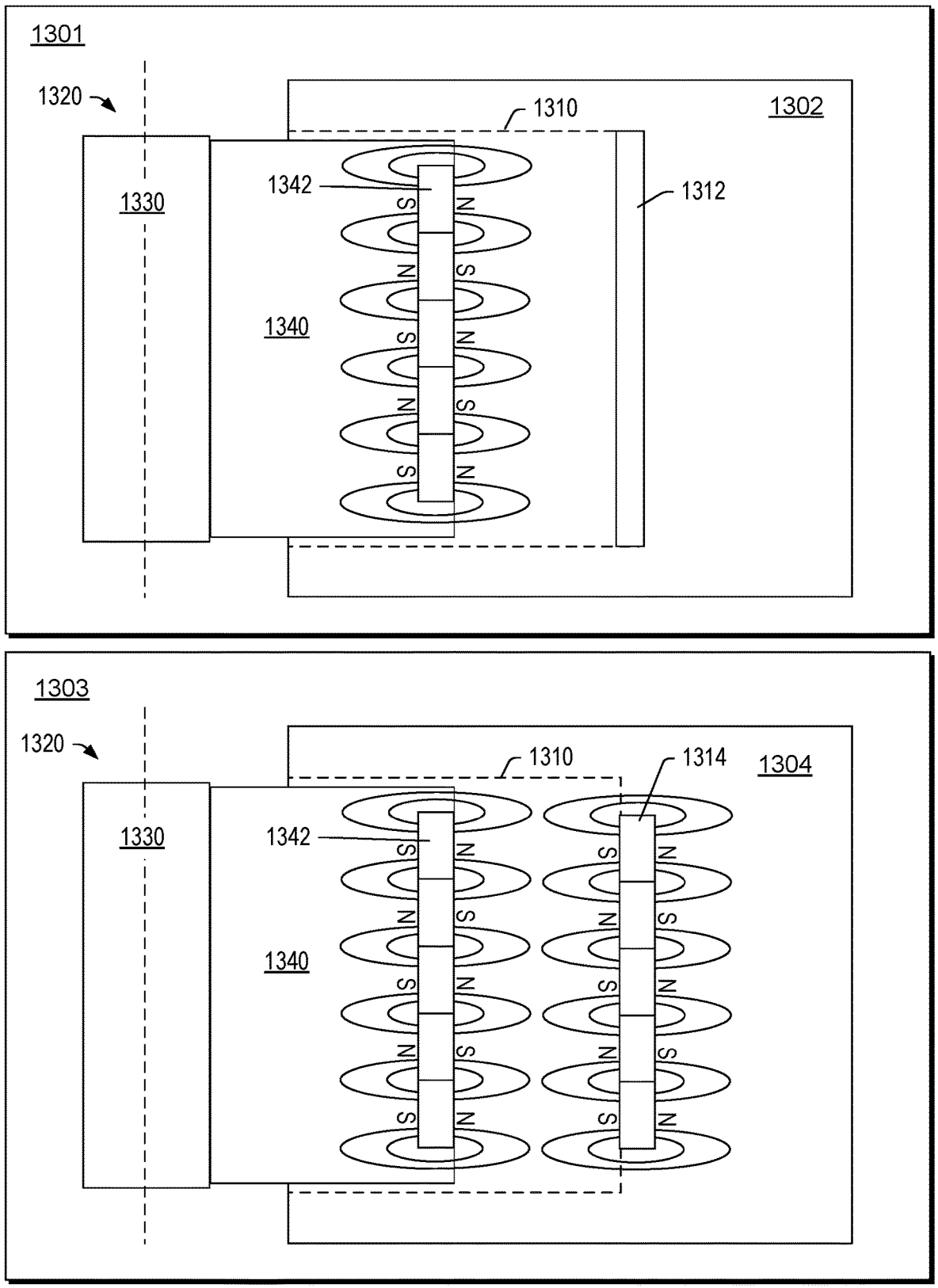
FIG. 13 is a diagram of an example of a leaf and a leaf receptacle.

FIG. 13 shows an example of a device 1301 that includes a housing 1302 and a hinge assembly 1320. As shown, the housing 1302 includes a receptacle 1310 that includes a ferromagnetic material 1312 and the hinge assembly 1320 includes a barrel 1330 and a leaf 1340 that includes a magnet 1342. The hinge assembly 1320 may be operatively coupled to the housing 1302 via interaction between the ferromagnetic material 1312 and the magnet 1342.

FIG. 13 also shows an example of a device 1303 that includes a housing 1304 and a hinge assembly 1320. As shown, the housing 1304 includes a receptacle 1310 that includes a magnet 1314 and the hinge assembly 1320 includes a barrel 1330 and a leaf 1340 that includes a magnet 1342. The hinge assembly 1320 may be operatively coupled to the housing 1304 via interaction between the magnet 1314 and the magnet 1342. As an example, the interaction may facilitate in aligning the leaf 1340 with the receptacle 1310.

Figure 14:
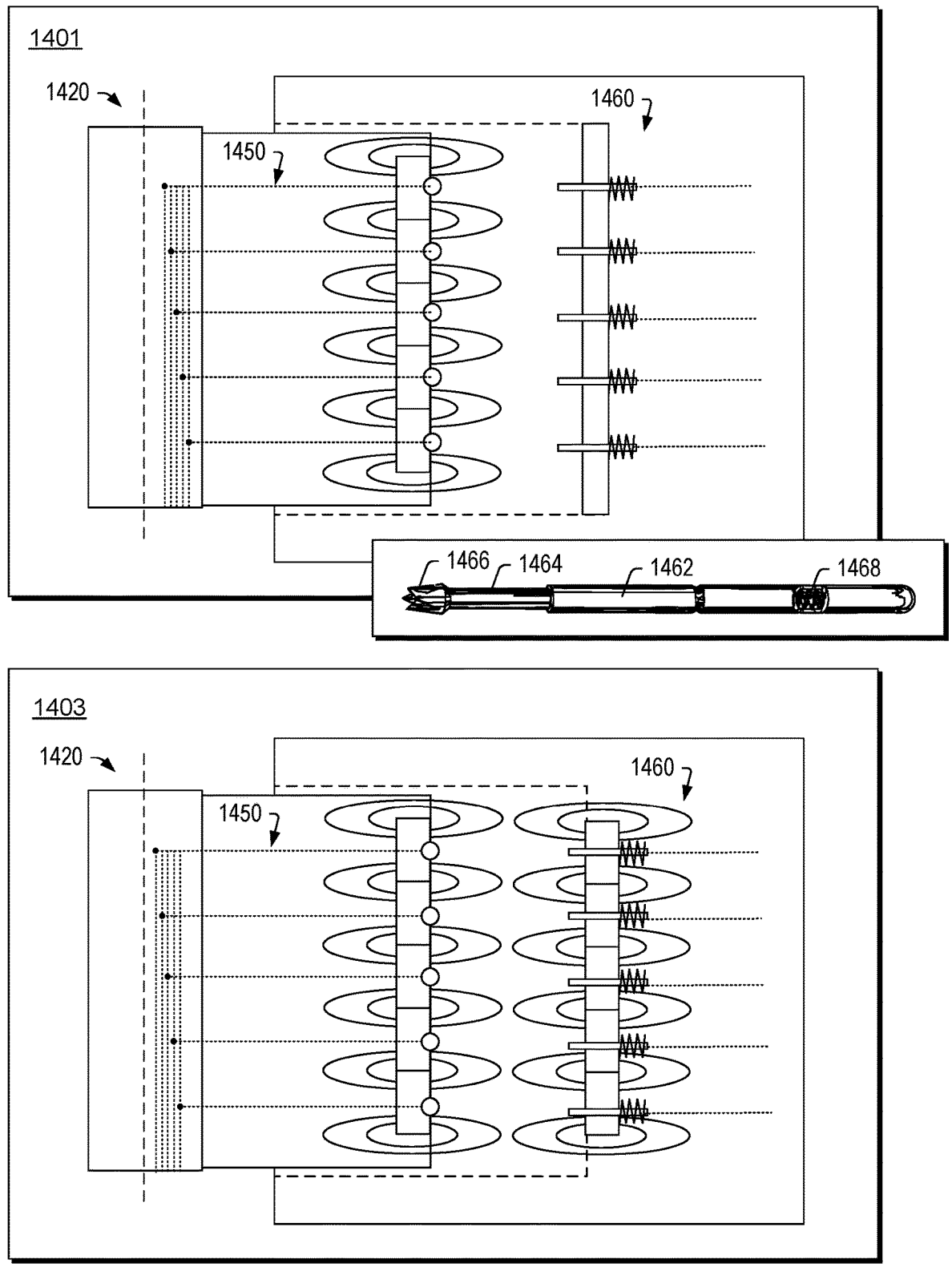
FIG. 14 is a diagram of an example of a leaf and a leaf receptacle.

FIG. 14 shows examples of devices 1401 and 1403 akin to the devices 1301 and 1303 of FIG. 13 where the devices 1401 and 1403 include electrical connectors 1450 and 1460. Specifically, the electrical connectors 1450 can be embedded in and/or disposed on a leaf while the electrical connectors 1460 can be disposed in a housing where, for example, they are accessible via a receptacle of the housing.

As an example, the electrical connectors 1450 and 1460 can include pin connectors. Such connectors may include one or more springs and a plunger that may be biased in part by a spring, for example, consider a pogo pin connector. As an example, magnetic force may cause electrical contacts to be made via the electrical connectors 1450 and 1460.

Ferromagnetic materials may be characterized as being materials that can become permanently magnetized. Some examples of ferromagnetic materials include iron, nickel, cobalt, and alnico, an aluminum-nickel-cobalt alloy.

As an example, when a material is placed into a magnetic field its atoms can acquire an induced magnetic moment pointing in a direction opposite to that of the magnetic field such that the material itself becomes magnetic, which may be referred to as diamagnetism. A diamagnetic field produced within a material can oppose an applied magnetic field (e.g., external field). If the atoms of a material have no magnetic moment of their own then diamagnetism is the magnetic property of the material and the material is called diamagnetic (e.g., consider copper).

In paramagnetic materials, magnetic moments of the electrons in an atom do not completely cancel out, and each atom has a magnetic moment. In paramagnetic materials such as, for example, aluminum, neighboring atoms do not align themselves with each other in the absence of an external magnetic field. The magnetic fields produced by the individual atoms therefore tend to cancel each other. An external magnetic field tends to align the magnetic moments in the direction of the applied field, but thermal motion tends to randomize the directions. The paramagnetic field produced by the aligned magnetic moments reinforces the external field, but at room temperatures it is on the average approximately 10 times stronger than the diamagnetic field and therefore tends to be quite weak.

As an example, a connector can include one or more components made of a non-ferromagnetic material and/or one or more components made of a ferromagnetic material. As an example, a connector can include one or more components made of a paramagnetic material. As an example, connector can include one or more components made of electrically conductive material that is non-ferromagnetic. As an example, one or more components of a connector or connectors can be made of a material that includes one or more of aluminum, magnesium, tungsten and titanium.

As an example, a pin connector 1460 can include a slender hollow cylinder 1462 that includes a movable shaft 1464 (e.g., a pin) with a contact end 1466 where one or more springs 1468 apply a force to the shaft 1464. In the example of FIG. 14, the contact end includes a shape that can contact another contact piece such as a ball (e.g., a spherical surface). For example, a leaf can include one or more contacts suitably shaped for contacting a portion of one or more corresponding pin connectors. As an example, when pressured between two components (e.g., via magnetic force, etc.), a pin connector may make contact with two circuits and thereby connect them together.

As an example, pins may be arranged in an array, for example, for connecting nodes of circuitry. As an example, a bed of nails approach may be utilized, optionally via nails extending from a plane defined by a portion of a receptacle, a portion of a leaf, etc. As an example, a leaf can include an array of contacts such as ball contacts or other types of contacts that can form nodes for making electrical connections. As an example, a system can include an array of nodes and an array of pin connectors where the pin connectors can contact corresponding nodes to electrically connect circuits. As an example, magnetic force can be utilized to apply a pressing force between nodes and pin connectors. For example, consider a leaf that includes an array of nodes and a receptacle that includes an array of pin connectors where the leaf and/or the receptacle include magnets that generate an attractive force. In such a manner, contact can be in a relatively simultaneously manner. As an example, where a leaf includes a magnet and a receptacle includes a magnet, the magnets may align to assure proper alignment of nodes and pin connectors.

As an example, a connector may include an array that takes the form of a ring that includes hundreds or thousands of individual pogo pins (e.g., a pogo tower). As an example, a leaf may be a needle like leaf (e.g., an evergreen is a plant that tends to have leaves throughout the year). For example, a leaf may be a cylindrical structure that extends from a barrel of a hinge assembly.

Figure 15:
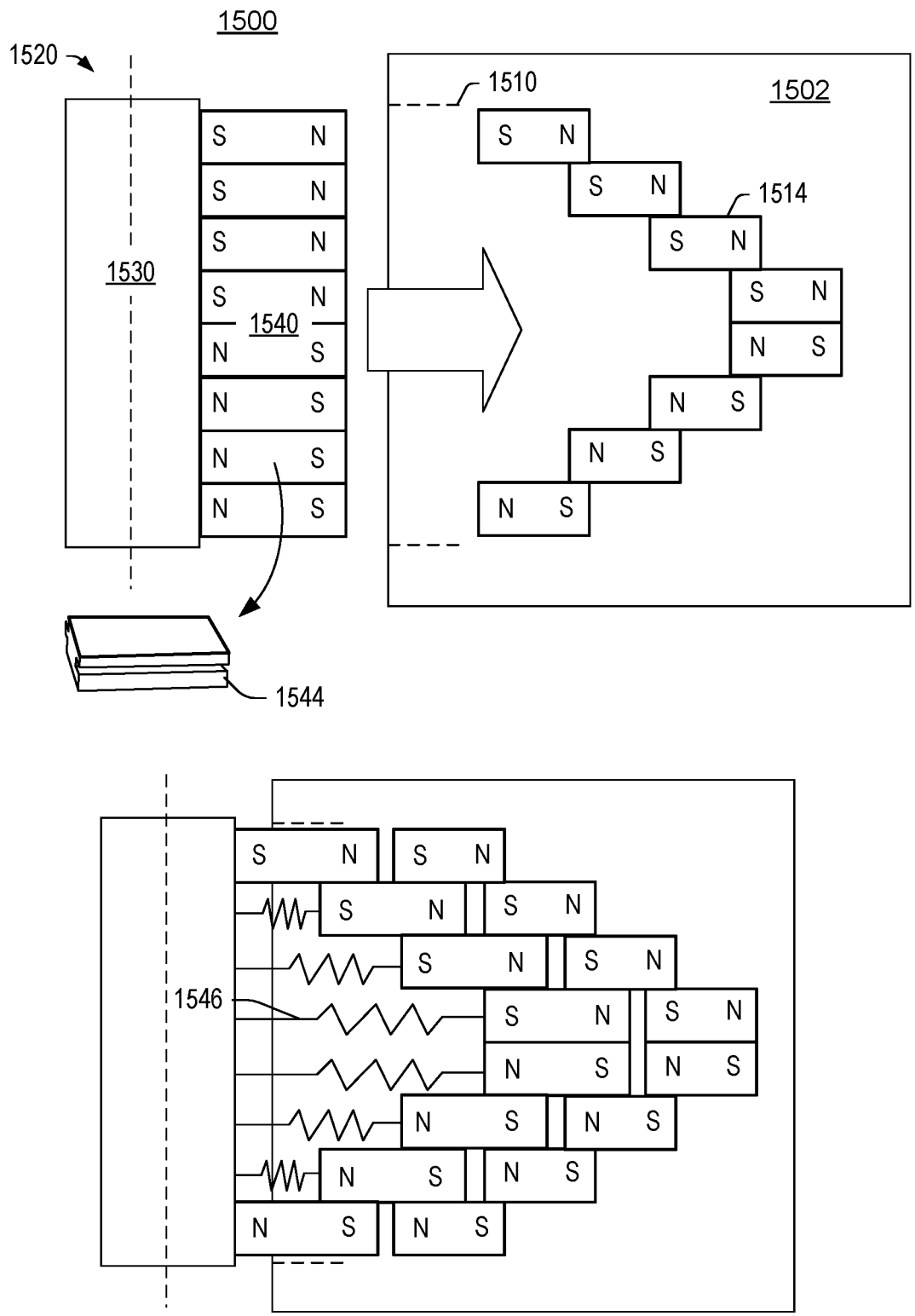
FIG. 15 is a diagram of an example of a leaf and a leaf receptacle.

FIG. 15 shows an example of a device 1500 that includes a housing 1502 that includes a receptacle 1510 with magnets 1514 and that includes a hinge assembly 1520 that includes a barrel 1530 and a leaf 1540 that includes magnets 1544 and springs 1546. As shown, the magnets 1544 can be tongue and groove magnets that allow for translation. For example, where the magnets 1514 and the magnets 1544 are brought into proximity, the magnets 1514 and 1544 can attract such that the springs 1546 stretch while the tongues move in grooves to extend the length of the leaf 1540.

As an example, the barrel 1530 may be of a size sufficient to house at least a portion of the magnets 1544. In such an example, the hinge assembly 1520 may have a relatively clean appearance and be smaller in a retracted state of the magnets 1544 compared to an extended state of the magnets 1544.

Figure 16:
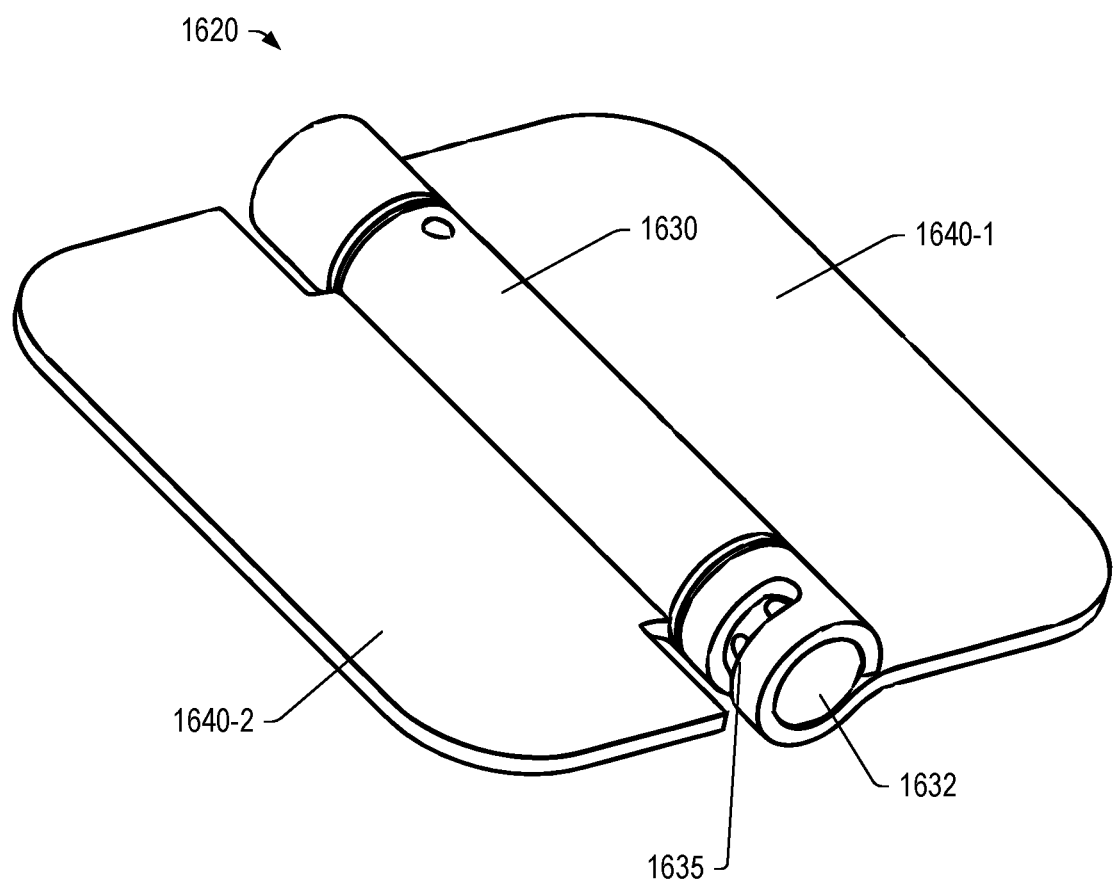
FIG. 16 is a diagram of an example of a hinge assembly.

FIG. 16 shows an example of a hinge assembly 1620 that includes a barrel 1630 with an axle 1632 as well as two leafs 1640-1 and 1640-2. As shown, the hinge assembly 1620 includes a tensioning mechanism 1635 that can be utilized to adjust tension with respect to pivoting one or both of the leafs 1640-1 and 1640-2 about an axis defined by the axle 1632.

As an example, the leaf 1640-1 and/or the leaf 1640-2 can include one or more magnets. For example, consider magnets as shown in the examples of FIG. 10, FIG. 11 and/or FIG. 12. As an example, the hinge assembly 1620 can include one or more connectors, which may be, for example, electrical connectors and/or optical connectors. As an example, one or more of the hinge assemblies of FIG. 10, FIG. 11 and/or FIG. 12 may include axially offset leaves or non-axially offset leaves.

Figure 17:
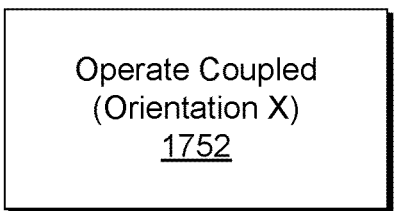
FIG. 17 is a diagram of an example of a system and an example of a method.
Figure 17:
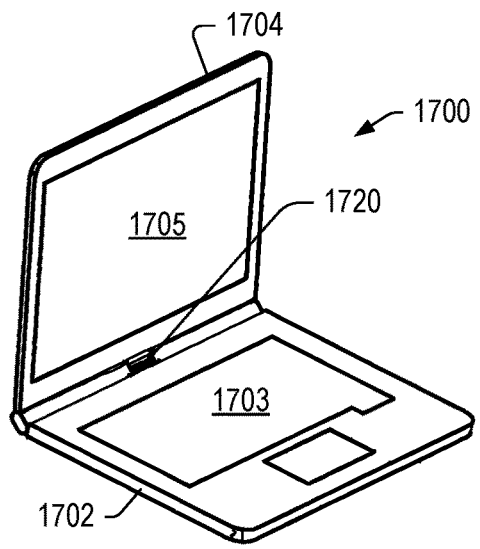
Figure 17:
Figure 17:
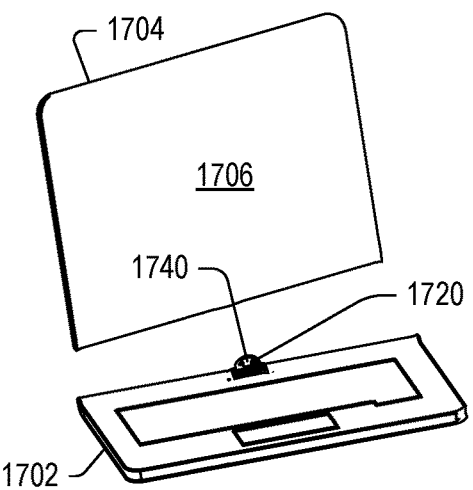
Figure 17:
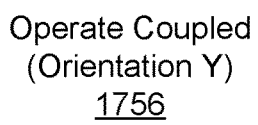
Figure 17:
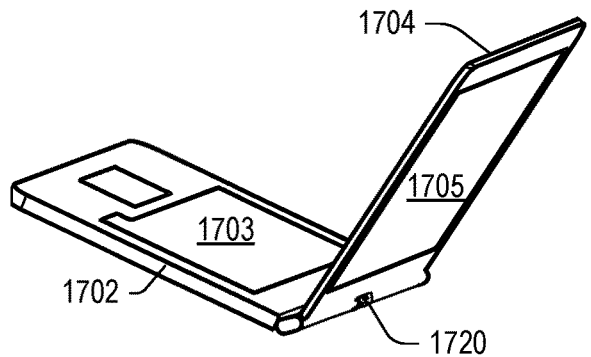

FIG. 17 shows an example of a system 1700 and an example of a method 1750. As shown, the system 1700 includes two housings 1702 and 1704 operatively coupled via a hinge assembly 1720. As shown in the example of FIG. 17, a leaf 1740 of the hinge assembly 1720 may be substantially centered along an axial lengthwise dimension such that it can function in a plurality of orientations of a housing or housings.

In the example of FIG. 17, the housing 1702 includes a keyboard 1703 that defines a keyboard side of the housing 1702 and the housing 1704 includes a display 1705 that defines a display side of the housing 1704. The hinge assembly 1720 allows for decoupling of the housing 1704 (e.g., from a first orientation) and recoupling of the housing 1704 such that a back side 1706 can face the keyboard side of the housing 1702 (e.g., to a second orientation). In such an example, the housing 1704 may be rotated in a clamshell manner such that the back side 1706 covers the keyboard 1703. In such an example, a back side of the housing 1702, which may not include a keyboard 1703 (e.g., may be a relatively smooth, substantially planar surface, etc.), may form a back side of a tablet orientation of the system 1700 where the display 1705 may be an outwardly visible display of the tablet orientation. As an example, the display 1705 may be a touchscreen display and/or a stylus sensitive display. In the example orientations of FIG. 2 (e.g., top orientation and bottom orientation), the housings 1702 and 1704 can substantially align at their side edges.

As mentioned, the leaf 1740 of the hinge assembly 1720 can be substantially centered along an axial lengthwise dimension, which may correspond to an edge dimension of the housing 1702 and an edge dimension of the housing 1704. For example, the housing 1704 can include a single receptacle that can receive the leaf 1740 of the hinge assembly 1720 in multiple orientations of the housing 1704 with respect to the housing 1702. As an example, the housing 1702 can include a single receptacle that can receive another leaf of the hinge assembly 1720. As an example, the hinge assembly 1720 may be oriented in various orientations and receive via one leaf, one housing, and receive via another leaf, another housing.

As an example, a housing may include a receptacle along one edge and an receptacle along another edge. In such an example, the housing may be oriented such that either receptacle can receive a leaf of a hinge assembly.

As to the method 1750, it includes an operation block 1752 for operating a coupled system in a first orientation, a decouple block 1754 for decoupling a housing of the system from another housing of the system and an operation block 1756 for operating the system in a second orientation that differs from the first orientation. For example, the method 1750 may be performed with respect to the system 1700 where the system 1700 can be operated in two different orientations, which may be a notebook orientation and a tablet orientation.

Figure 18:
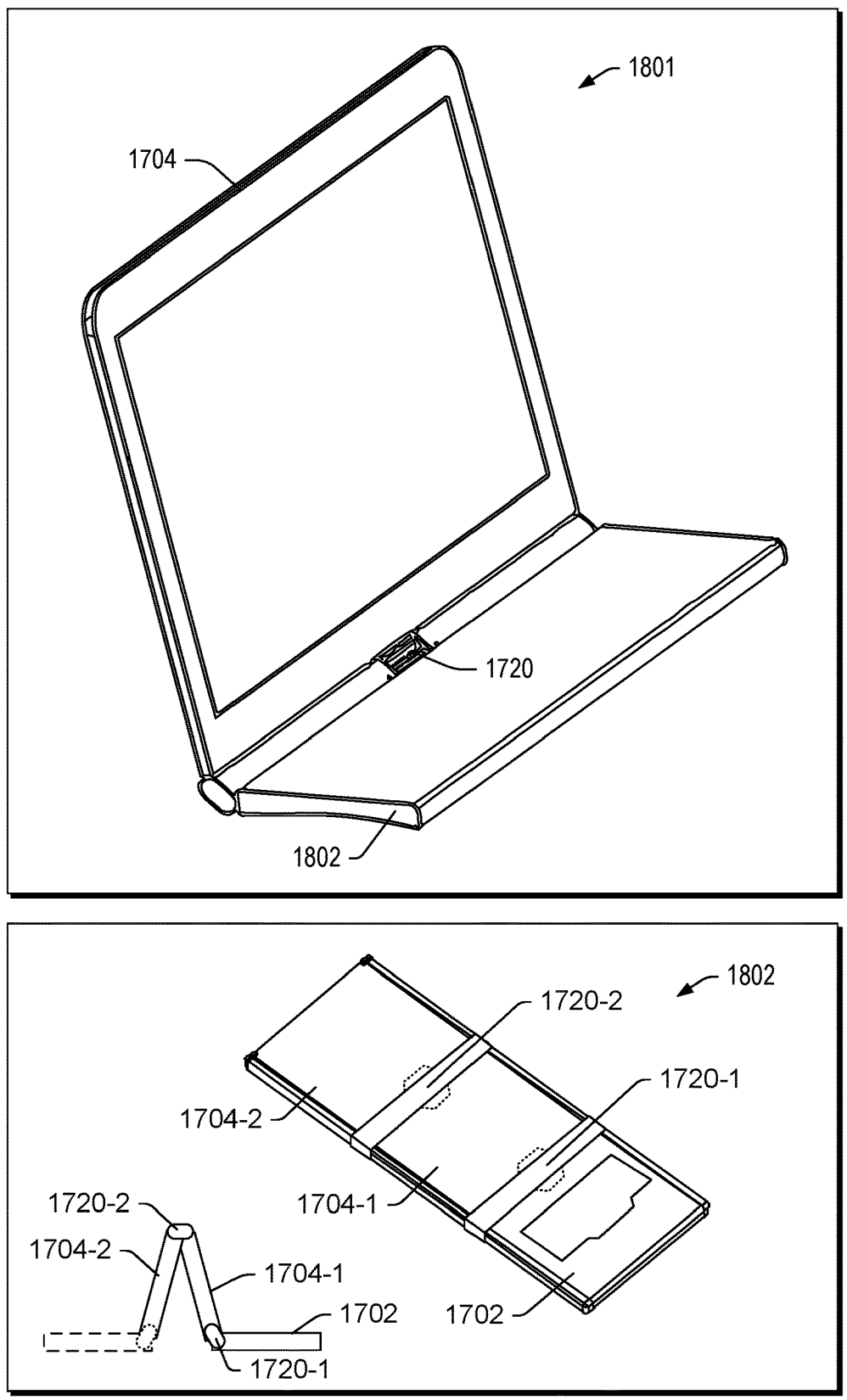
FIG. 18 is a diagram of examples of systems.

FIG. 18 shows an example of a portion of the system 1700 in a configuration 1801 where the housing 1702 is replaced with a different housing 1802, which may be a stand, which may optionally include circuitry and/or one or more other components (e.g., passive and/or active). In such an example, the housing 1702 may be decoupled from the hinge assembly 1720 and the housing 1802 coupled to the hinge assembly 1720. As an example, the housing 1802 may house one or more electronic components such as, for example, a battery or batteries. As an example, the housing 1802 may be shaped to function as a hand grip, which may be suitable for gripping via a user's left hand and/or a user's right hand. As an example, the housing 1802 may be a stand that is shaped to rest and/or couple to a dashboard, a table, etc. As an example, the housing 1802 may be a dock and may include one or more ports (e.g., power, USB, I2C, I2S, 1-Wire, SMBus, SPI, UART, etc.). As an example, one or more ports may be suitable for video and/or audio, network communication, etc. (e.g., and optionally power).

As to a serial bus, consider a plug with a cable that includes four wires plus a shield or, for example, nine wires plus a shield. In such an example, consider contacts (e.g., pins and/or nodes) such as, for example, four (e.g., with one power supply, two data, and one ground), five, nine (e.g., USB 3.0), eleven (e.g., powered USB 3.0), or twenty-four (e.g., USB Type-C cable connector). As to a two wire bus, consider two wires for a serial data line (SDA) and a serial clock line (SCL). As to a three wire bus, consider a bit clock line, a word clock line (e.g., word select (WS) or left right clock (LRCLK)) and a multiplexed data line (e.g., or multiplexed data lines if more than three wires).

As to optical connections, connections may be physical contact connections where, for example, a slightly convex surface with an apex of a curve is substantially centered on a fiber such that when connectors are mated fiber cores come into direct contact with one another. As an example, optical connectors can include a fiber end face polished at an angle to help avoid light that reflects from the interface from traveling back up the fiber (e.g., angle-polished connectors mated to other angle-polished connectors). As an example, angles may provide for low back reflection when an output end of a fiber is disconnected. As an example, magnets can be utilized to align fiber ends of connectors, which may be, for example, in a receptacle and in a leaf or other component that can mate with a receptacle, etc. As an example, a housing can include optical emission circuitry (e.g., LED, laser, etc.) and/or optical detection circuitry, for example, to convert optical signals back into electrical impulses (e.g., semiconductor photodiode, etc.).

FIG. 18 also shows an example of a configuration 1802 where two housings 1704-1 and 1704-2 are operatively coupled via a hinge assembly 1720-2 and where the housing 1704-1 is operatively coupled via a hinge assembly 1720-1 to the housing 1702. In such an example, the housings 1704-1 and 1704-2 may be oriented such that two people can view displays (see, e.g., tented orientation in the lower left view of FIG. 18). As an example, another housing such as the housing 1702 may be operatively coupled to the housing 1704-2 such that two people can interact with a system that includes, for example, four housing operatively coupled via three hinge assemblies.

As mentioned, a receptacle may be movable, for example, movable responsive to the presence of a magnetic field or magnetic fields. For example, a leaf can include a magnet or magnets that cause a receptacle to move once the leaf is brought into proximity to the receptacle. Such movement of a receptacle may be via magnetic attraction, magnetic repulsion, magnetic attraction and magnetic repulsion. As an example, a receptacle can be operatively coupled to one or more springs and/or one or more other types of elements (e.g., viscous elements, etc.).

Figure 19:
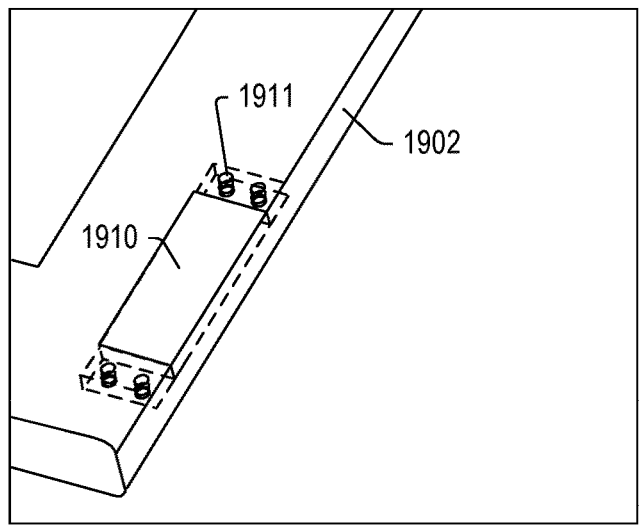
FIG. 19 is a diagram of an example of a system and an example of a method.
Figure 19:
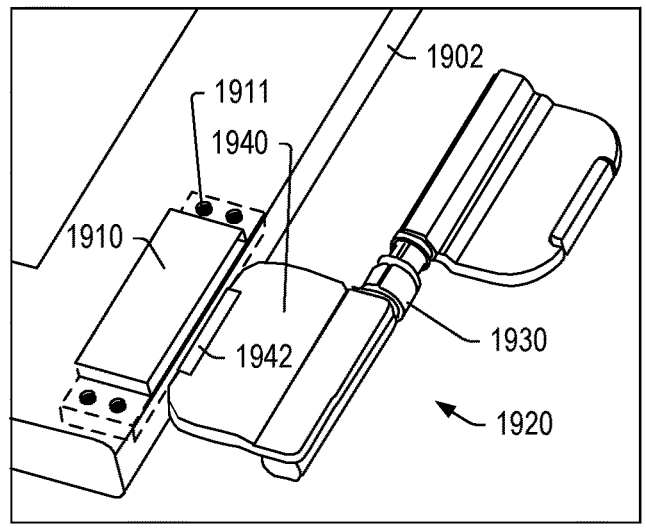
Figure 19:
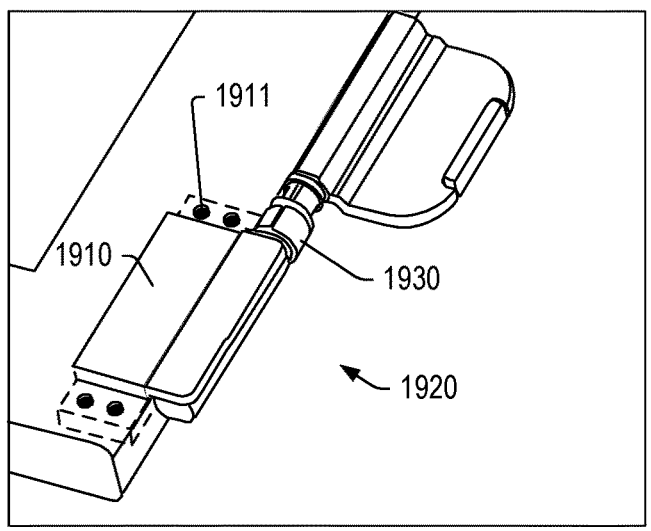

FIG. 19 shows an example of a movable receptacle 1910 that is movable with respect to its housing 1902. As an example, the receptacle 1910 may be biased via one or more springs 1911, which can act to position the receptacle 1910 in a recessed state. As an example, a recessed state of a receptacle can provide for a relatively smooth surface of a housing. For example, in FIG. 19, a surface of the receptacle may be positioned even with an exterior surface of the housing 1902. In such an example, where the receptacle 1910 is not in use to couple to a leaf, etc., the housing 1902 can have a relatively clean exterior appearance. Such an approach can help seal the receptacle from debris. For example, where a receptacle includes a magnet, such an approach may avoid ferromagnetic debris from coming into contact with the magnet.

As shown in FIG. 19, where a hinge assembly 1920 is brought into proximity to the receptacle 1910, the receptacle 1910 may move such that it becomes accessible to receive a leaf 1940 of the hinge assembly 1920, which can include a barrel 1930 (e.g., an axle, etc.). As shown in FIG. 19, the leaf 1940 includes a magnet 1942 where its associated magnetic field can cause the receptacle 1910 to move from a recessed state to its accessible state (e.g., transition from the recessed state to the accessible state). As an example, such movement may be due to the receptacle 1910 being made of or including a ferromagnetic material and/or due to the receptacle 1910 including one or more magnets. As an example, where one or more springs bias a receptacle, a magnetic field may provide magnetic force that can at least in part overcome spring force such that the receptacle moves. Upon decoupling of the leaf 1940 from the receptacle, the spring force can cause the receptacle to transition from its accessible state to its recessed state.

FIG. 19 also shows an example of a method 1950 that includes a recessed state block 1952 for positioning a receptacle in a recessed state, an accessible state block 1954 for positioning the receptacle in an accessible state and a coupled state block 1956 for coupling a leaf and the receptacle, for example, where the leaf is a leaf of a hinge assembly.

Figure 20:
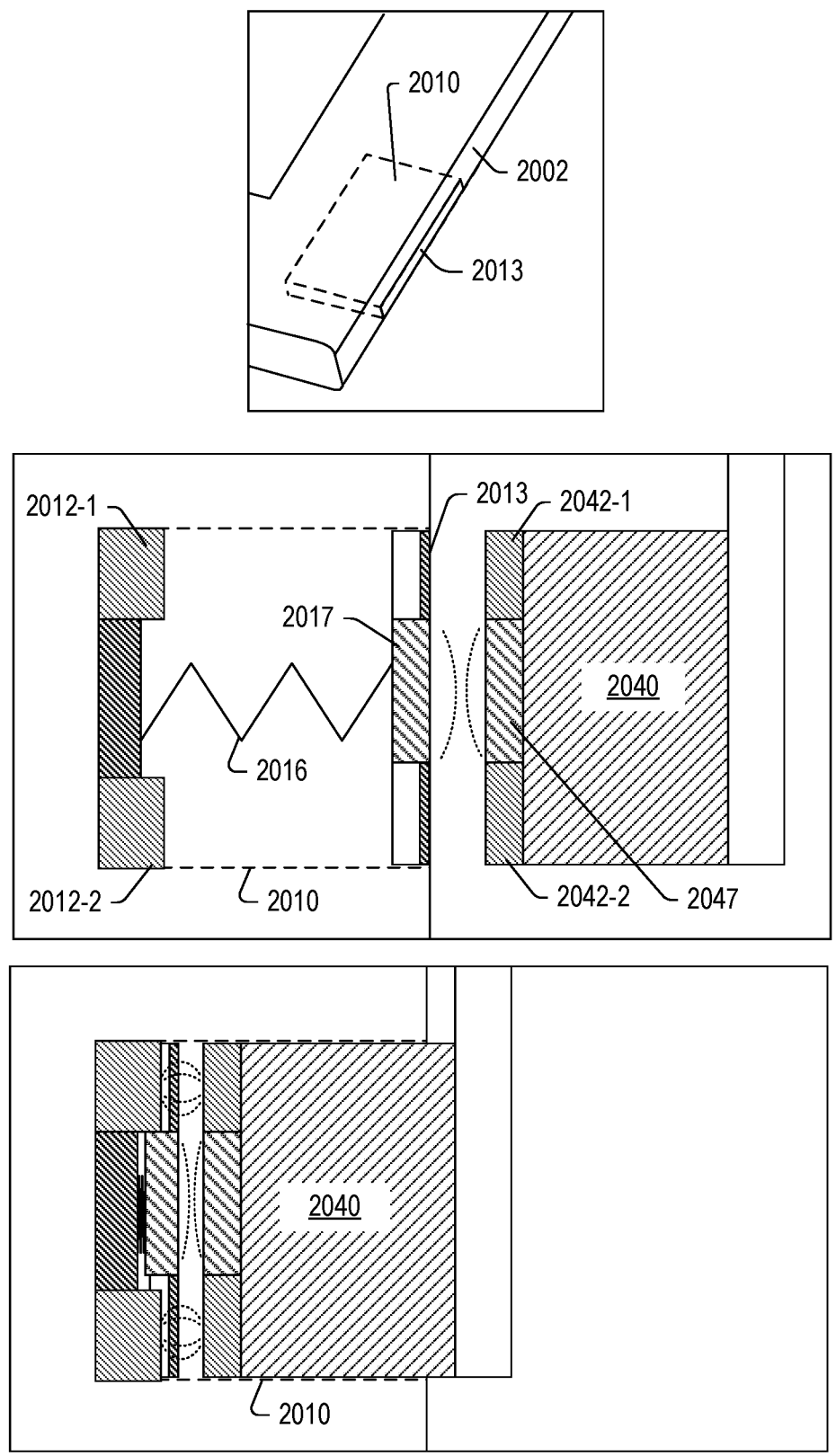
FIG. 20 is a diagram of an example of a system.

FIG. 20 shows an example of a housing 2002 and an example of a leaf 2040, for example, as a portion of hinge assembly. As shown in FIG. 20, the housing 2002 includes a receptacle 2010 and a cover 2013. As shown, the cover 2013 can be in a position that is approximately even with an exterior surface of the housing 2002, for example, to provide a smooth exterior surface that may be aesthetically pleasing. The cover 2013 can also be positioned interiorly such that the receptacle 2010 is available for receipt of at least a portion of the leaf 2040.

As an example, the receptacle 2010 can include magnets 2012-1 and 2012-2 that are disposed within the receptacle 2010, for example, at an end of the receptacle 2010 where they may be fixed. The receptacle 2010 can also include a spring 2016 (e.g., or springs) that bias the cover 2013 in a closed position where an exterior surface of the cover 2013 is approximately even with an exterior surface of the housing 2002. As shown, the cover 2013 can include a magnet 2017.

As to the leaf 2040, it can include a magnet or magnets 2042-1, 2042-2 and 2047. For example, a single magnet may be included where polarities of the magnet differ for different portions or, for example, the magnets 2042-1 and 2042-2 may differ in their polarity with respect to the magnet 2047.

As shown in the example of FIG. 20, the magnet 2047 of the leaf 2040 can repel the magnet 2017 of the cover 2013 such that the presence of the leaf 2040 can cause the cover 2013 to move into the receptacle 2010 (e.g., overcoming the spring force of the spring 2016). In such an example, the magnets 2042-1 and 2042-2 of the leaf 2040 can be attracted to the magnets 2012-1 and 2012-2 of the receptacle 2010. In such an example, the attractive force is greater than the repulsion force such that the leaf 2040 is magnetically held within the receptacle 2010.

As shown in FIG. 20, the cover 2013 may include features to accommodate the magnets 2012-1 and 2012-2; noting that other features (e.g., as to type, shape, size, etc.) may be included (e.g., additionally or alternatively).

In the example of FIG. 20, the cover 2013 can transition between cover and recessed states in a manner responsive to presence of the magnet or magnets of the leaf 2040. As an example, the cover 2013 can help protect the magnets 2012-1 and 2012-2 of the receptacle 2010 from debris.

As an example, the cover 2013 may be without a magnet or magnets. For example, where an attraction force between the magnets 2012-1 and 2042-1 and/or between the magnets 2012-2 and 2042-2 is sufficient at a distance corresponding to a depth of the receptacle 2010, such a force may overcome the force of the spring 2016 to drive the cover 2013 into the receptacle such that the magnets 2012-1 and 2042-1 and/or 2012-2 and 2042-2 can attract with force sufficient to operatively coupled the leaf 2040 to the housing 2002. In such an example, the leaf 2040 can be a leaf of a hinge assembly that includes another leaf that couples the hinge assembly to another housing such that the housings are pivotable with respect to each other via the hinge assembly.

As an example, the leaves and receptacles of the examples of FIG. 19 and/or FIG. 20 may include connectors such as, for example, electrical and/or optical connectors. As an example, such connectors can be utilized to transfer power and/or information. As an example, a connector may be a bus connector such as, for example, a serial bus connector and/or a parallel bus connector. As an example, a bus connector may be a universal serial bus connector (e.g., for USB 2.0, USB 3.0, etc.). As an example, a connector may be a video and/or audio connector (e.g., HDMI, display port, etc.).

As an example, a hinge assembly can include one or more interchangeable magnetic hinge leaves. As an example, a hinge leaf may include one or more of conductors, optical fibers, pins, nodes, etc.

Figure 21:
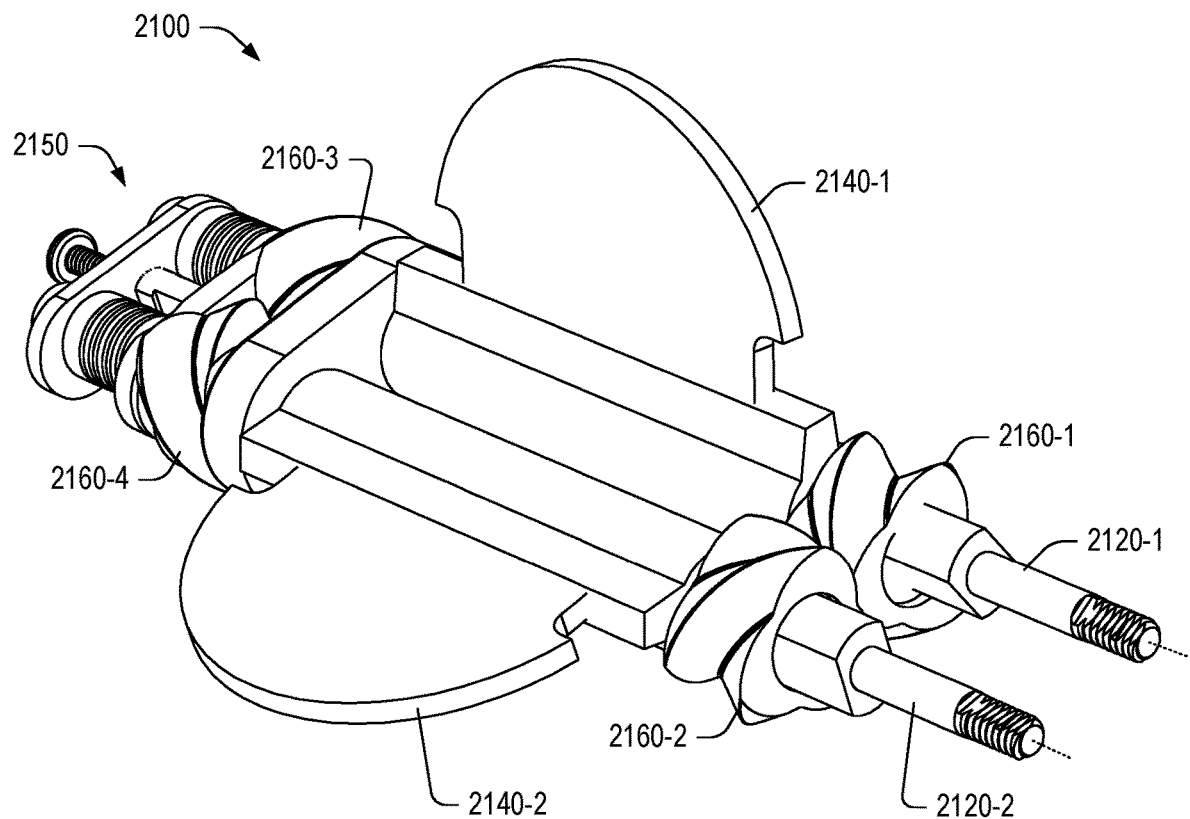
FIG. 21 is a diagram of an example of a hinge assembly.

FIG. 21 shows an example of a hinge assembly 2100 that includes axles 2120-1 and 2120-2, gears 2160-1, 2160-2, 2160-3 and 2160-4, a mechanism 2150, and leaves 2140-1 and 2140-2, which may include one or more magnets and, for example, one or more other features (e.g., conductors, optical fibers, pins, nodes, etc.). As an example, a leaf may be operatively coupled to an axle portion via a magnet or magnets. As an example, the leaves 2140-1 and/or 2140-2 may be interchangeable with one or more other types of leaves (e.g., leaves with one or more other types of features).

As an example, each of the axles 2120-1 and 2120-2 can define a respective axis about which a housing coupled to a respective, corresponding one of the leaves 2140-1 and 2140-2 may pivot.

Figure 22:
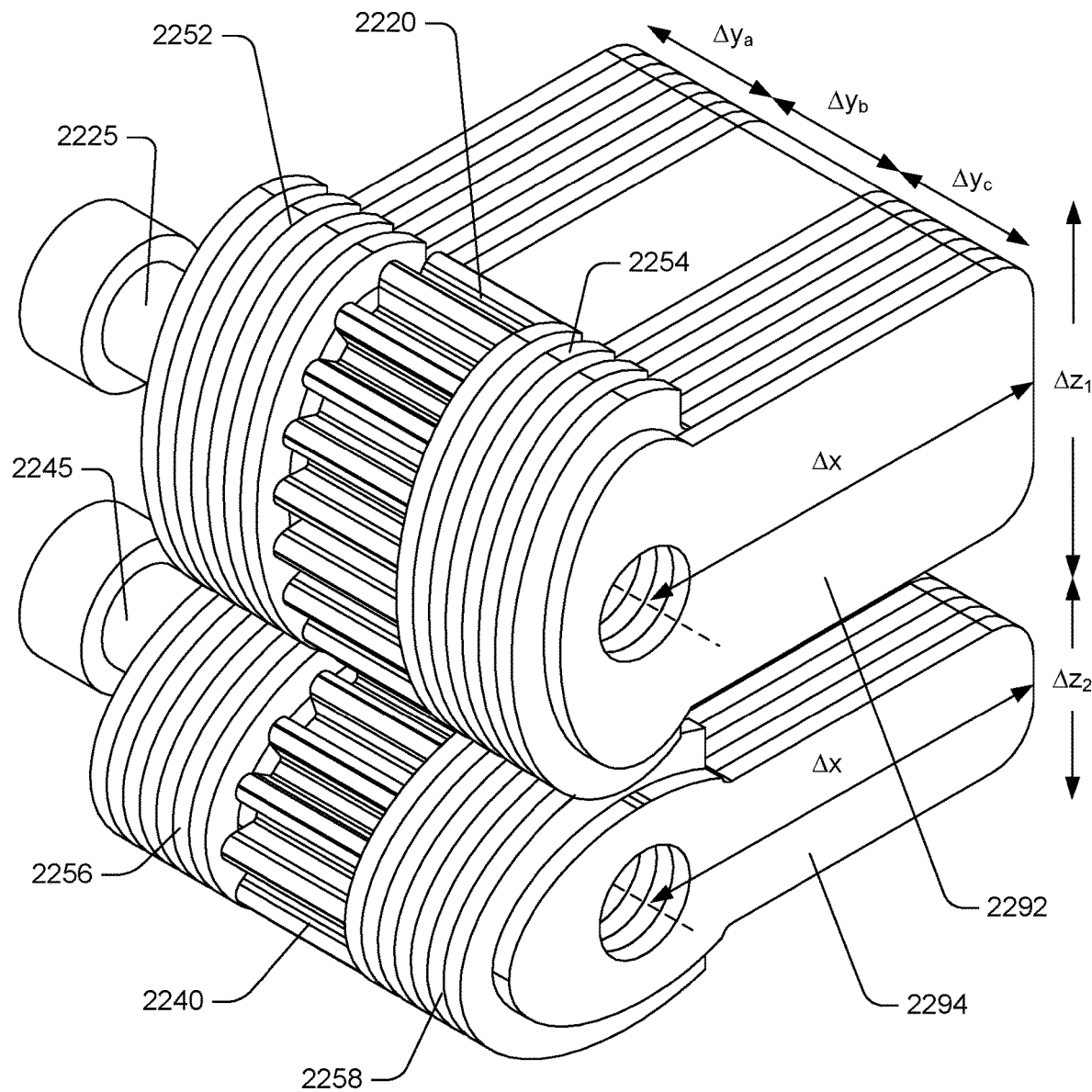
FIG. 22 is a diagram of an example of a portion of a hinge assembly.

FIG. 22 shows a first gear 2220, which may be operatively coupled to a first housing, and a second gear 2240, which may be operatively coupled to a second housing. In such an example, the first and second gears 2220 and 2240 mesh, for example, to orient the first and second housings, for example, in a front side to front side orientation and in a back side to back side orientation. As an example, the gears 2220 and 2240 may be configured to be detached and reattached to one or more housings. As an example, leaf portions 2292 and 2294 may include one or more magnets that can be received within a corresponding receptacle of a housing. As an example, a magnet can include a plurality of north poles and a plurality of south poles.

As an example, the gears 2220 and 2240 can rotate about respective axles 2225 and 2245 that may be coupled via a coupler (e.g., as part of a hinge assembly, etc.). The gears 2220 and 2240 may be elliptical or circular and include teeth. In the example of FIG. 22, sets of plates 2252 and 2254 are disposed adjacent to the gear 2220 and sets of plates 2256 and 2258 are disposed adjacent to the gear 2240. Such plates may mesh, for example, with interference fits therebetween to add friction or with clearances therebetween. Such plates may act as guards that hinder objects from getting caught in the gears 2220 and 2240 as they mesh (e.g., during rotation of at least one of the gears).

FIG. 22 shows a view of the gears 2220 and 2240, the axles 2225 and 2245 and the sets of plates 2252, 2254, 2256 and 2258. As shown, the sets of plates 2252, 2254, 2256 and 2258 may include extensions or tongue portions (see, e.g., the leaf portions 2292 and 2294) and head portions. For example, an extension may be received by a housing to support the head portion of a set of plates. As an example, each of the gears 2220 and 240 can include a gear head portion and an extension or a tongue (see, e.g., the leaf portions 2292 and 2294) where such an extension may be received by a housing to support the gear head portion. Various examples of dimensions are shown in FIG. 22, including an axis to tongue end dimension $\Delta x$, thickness dimensions $\Delta z_1$ and $\Delta z_2$ and dimensions $\Delta y_a$, $\Delta y_b$ and $\Delta y_c$, which correspond to dimensions of the set of plates 2252, the gear 2220 and the set of plates 2254; noting that dimensions may be specified that correspond to the set of plates 2256, the gear 2240 and the set of plates 2258.

As shown in FIG. 22, shapes may be elliptical and defined by a major axis (a) and a minor axis (b), which intersect at a center. As mentioned, a gear may rotate about an axle where the axle may be at the center of the gear. As an example, one gear may rotate with respect to another gear or gears may rotate in unison (e.g., synchronously). As illustrated in FIG. 22, the gear 2220 may be aligned along a major axis and the gear 2240 may be aligned along a minor axis.

Figure 23:
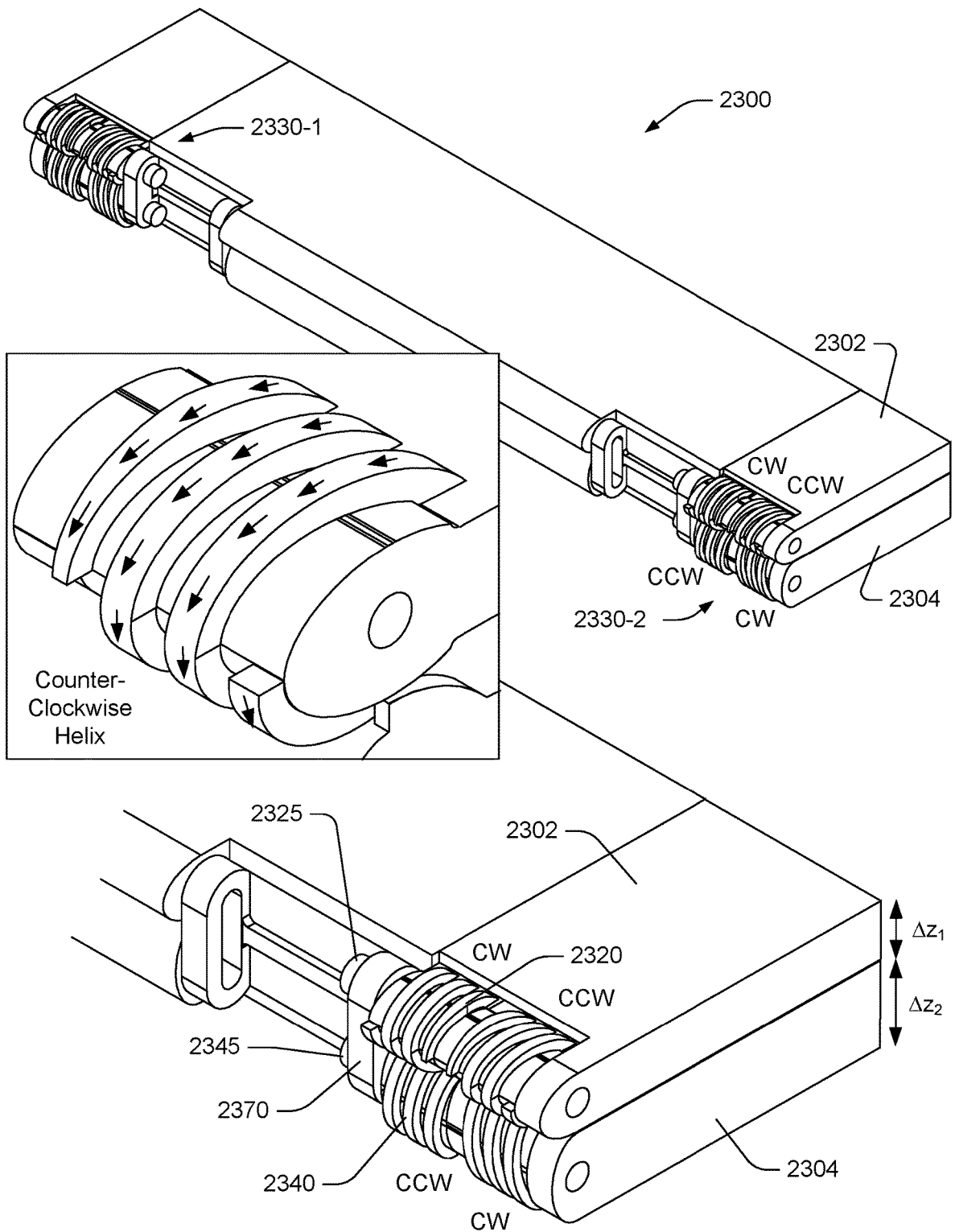
FIG. 23 is a diagram of an example of a system.

FIG. 23 shows an example of an assembly 2300 that includes a first housing 2302 that includes a front side and a back side and a thickness therebetween, a second housing 2304 that includes a front side and a back side and a thickness, a first set of gears 2330-1 and a second set of gears 2330-2. In the example of FIG. 23, thickness dimensions $\Delta z_1$ and $\Delta z_2$ are shown for the housings 2302 and 2304, respectively. As an example, the sets of gears 2330-1 and 2330-2 may be included in a hinge assembly or hinge assemblies, which may include one or more leaves where, for example, a housing may be decoupled, reoriented and recoupled. As an example, leaves or leaf portions can include one or more magnets where a leaf or leaf portion may be received by a receptacle of a housing, which may include one or more magnets.

As shown in FIG. 23, a first gear 2320 is operatively coupled to the first housing 2302 and a second gear 2340 is operatively coupled to the second housing 2304. In such an example, the first and second gears 2320 and 2340 mesh to orient the first and second housings 2302 and 2304, for example, in a front side-to-front side orientation and in a back side-to-back side orientation.

In the assembly 2300, the gears 2320 and 2340 rotate about respective axles 2325 and 2345 that are coupled via a coupler 2370 (e.g., as part of a hinge assembly, etc.). For example, the coupler 2370 may be disposed at an end of the gears 2320 and 2340 and receive the axles 2325 and 2345 such that the axles 2325 and 2345 remain a certain distance apart and such that the housings 2302 and 2304 remain coupled during rotation. As an example, a coupler may be proximate to a region through which one or more cables may pass, for example, from one housing to another housing. As an example, an assembly may include more than one coupler. For example, the assembly 2300 may include the coupler 2370 on one side of the gears 2320 and 2340 and another coupler on another side of the gears 2320 and 2340. As an example, a coupler may be positioned between gears, for example, as a spacer between portions of a gear of a first housing and between portions of a gear of a second housing. As an example, the gears 2320 and 2340 may be elliptical, circular or of another shape and include teeth. For example, as shown in FIG. 23, the "teeth" are shaped as helical ridges where adjacent helical ridges are separated by a helical groove (e.g., define a helical groove). In the example of FIG. 23, the gears 2320 and 2340 may be referred to as worm gears.

As shown in an enlarged view, a gear may be defined with respect to a reference frame. For example, using the visible end of the housings 2302 and 2304 as a reference, the gear 2320 includes two portions, one including a counter-clockwise helix (CCW) and the other including a clockwise helix (CW) while the gear 2340 includes two portions, one including a clockwise helix (CW) and the other including a counter-clockwise helix (CCW). Thus, as illustrated in the example of FIG. 23, a CCW portion of the gear 2320 meshes with a CW portion of the gear 2340 and a CW portion of the gear 2320 meshes with a CCW portion of the gear 2340.

As an example, a gear or gears may include multiple portions with helix orientations that may differ (e.g., or be the same). As shown, a corresponding gear or gears may include multiple portions with helix orientations that can mesh with such a gear or gears. As an example, gears may include portions that act to "balance" various forces (e.g., torque, etc.). In such an example, smoother movement may be achieved for movement of a housing with respect to another housing or simultaneous movement of two housings. As an example, a gear with a clockwise portion and a counter-clockwise portion that meshes with another gear with a clockwise portion and a counter-clockwise portion may act to provide for a no-slip condition.

As an example, a hinge assembly can include worm gears. As an example, a worm gear may be perceived, aesthetically, as being different than a spur gear. For example, helical teeth of a worm gear may be perceived as being smoother than the teeth of a spur gear. As an example, a worm gear may be fashion in a more "streamlined" manner. As an example, a worm gear may, when compared to a spur gear, have a less of an industrial look to a user.

Figure 24:
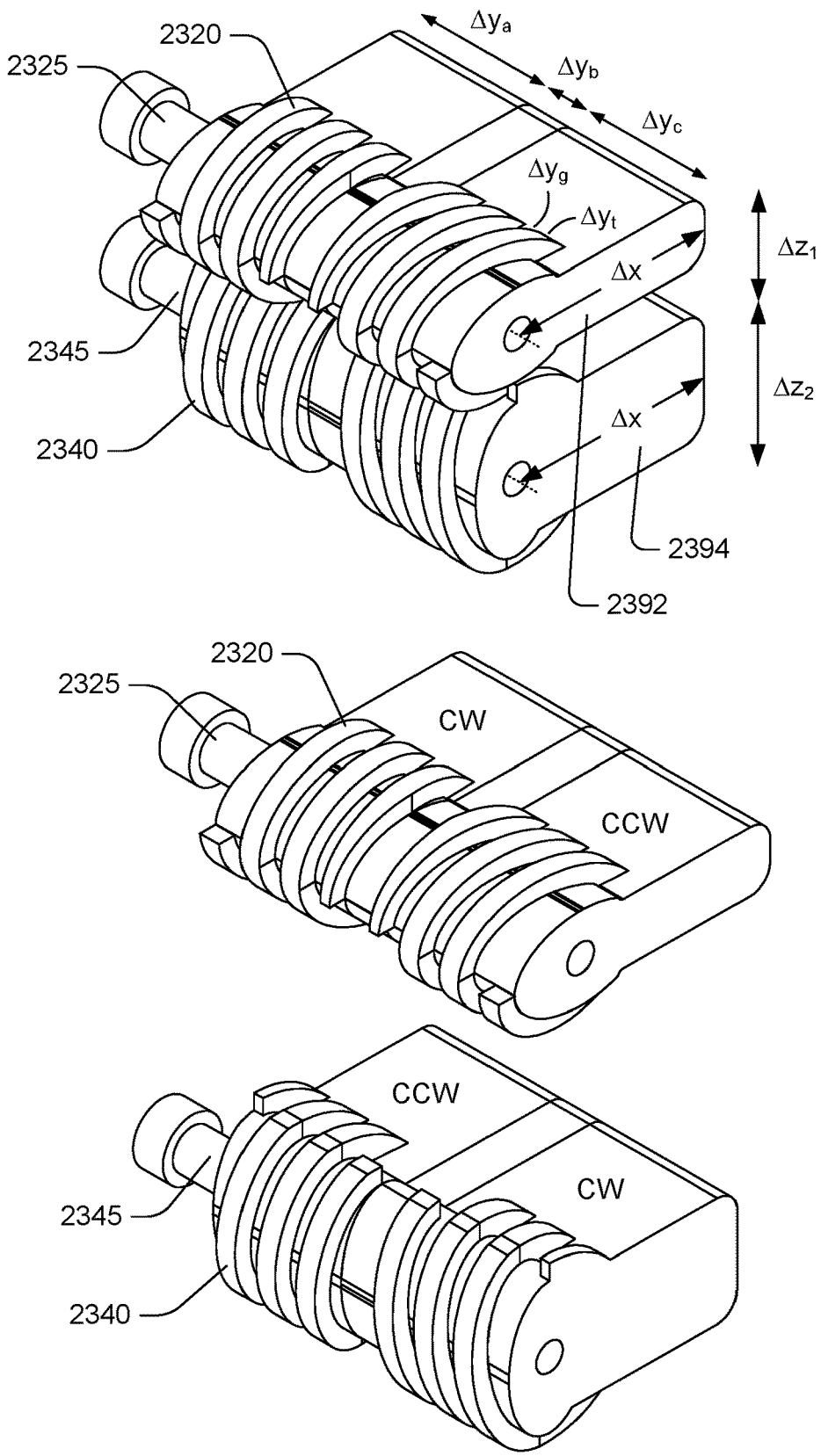
FIG. 24 is a diagram of an example of a portion of a hinge assembly.

FIG. 24 shows the gears 2320 and 2340 and the axles 2325 and 2345. As illustrated in FIG. 24, the gears 2320 and 2340 can be helical elliptical gears. In such an example, helical grooves defined by helical teeth. Various examples of dimensions are shown in FIG. 24, including an axis to tongue end dimension $\Delta x$; thickness dimensions $\Delta z_1$ and $\Delta z_2$; dimensions $\Delta y_a$, $\Delta y_b$ and $\Delta y_c$, which correspond to dimensions of a gear or gear portion, a spacer and another gear or gear portion; and dimensions $\Delta y_g$ and $\Delta y_r$, which correspond to a groove dimension and a tooth or ridge dimension. As an example, teeth on a helical gear can be cut at an angle to a gear face. As an example, a helix may include multiple turns (e.g., consider two turns, three turns, etc.). As an example, a gear may be defined at least in part by a pitch (e.g., a pitch of a helix being a dimension of a helix turn as measured in a direction parallel to an axis of the helix). As an example, a gear may be described as being right-handed or left-handed or, for example, clockwise or counter-clockwise. For example, with an observer's line of sight along a helix axis, if a clockwise screwing motion moves the helix away from the observer, then it may be defined as a right-handed helix; if towards the observer, then it may be defined as left-handed helix; or, for example, a stationary helix may be viewed as spiraling away from an observer in a clockwise (CW) or counter-clockwise (CCW) manner. The extent of engagement may make helical gears operate more smoothly (e.g., and quietly) than spur gears.

As shown in FIG. 24, the teeth (e.g., ridges) span an arc angle about a substantially elliptical head portion from which a tongue portion extends. For example, the gear 2320 includes a counter-clockwise portion with approximately four teeth segments (e.g., making about three turns) that define grooves therebetween (e.g., between adjacent segments) and the gear 2320 includes a clockwise portion with approximately four teeth segments (e.g., making about three turns) that define grooves therebetween (e.g., between adjacent segments). The gear 2340 includes a clockwise portion with approximately four teeth segments (e.g., making about three turns) that define grooves therebetween (e.g., between adjacent segments) and the gear 2340 includes a counter-clockwise portion with approximately four teeth segments (e.g., making about three turns) that define grooves therebetween (e.g., between adjacent segments). As illustrated, a segment may differ from another segment. For example, an end segment may include an arc angle less than an intermediate segment.

In the example of FIG. 24, the helixes of the gear 2320 terminate at or near the tongue portion, which is aligned with the major axis of the substantially elliptically shaped head portion while the helixes of the gear 2340 terminate at or near the tongue portion, which is aligned with the minor axis of the substantially elliptically shaped head portion. As an example, with respect to the head portions, in the views of FIG. 24, the gear 2320 may be considered an upward facing while the gear 2340 may be considered forward facing. As an example, where the gear 2340 is stationary, the gear 2320 may rotate about the gear 2340, for example, to achieve an arrangement where the gear 2320 is below the gear 2340 (see, e.g., uppermost view where the gear 2320 is above the gear 2340). In such an example, a "midway" point may be achieved where the tongue portions of the gears 2320 and 2340 extend away from each other, which may be referred to as a planar orientation of the gears 2320 and 2340.

As an example, an assembly may include a portion of the gear 2320 and a portion of the gear 2340. For example, consider a clockwise portion of the gear 2320 and a counter-clockwise portion of the gear 2340 or vice versa. As an example, a gap may exist between portions of a gear. As an example, a gear may include multiple clockwise portions and/or multiple counter-clockwise portions. For example, consider a gear such as the gear 2320 with multiple clockwise portions or with multiple counter-clockwise portions or, for example, the gear 2340 with multiple clockwise portions or with multiple counter-clockwise portions. As to a gap, the example of FIG. 24 shows a gap that is less than an axial length (e.g., along an axle axis) of a portion of a gear (e.g., a clockwise portion or a counter-clockwise portion). As an example, a gap may be of another dimension, which may be defined, for example, with respect to an axial length (e.g., along an axle axis) of a portion of a gear. For example, a gap may be greater than a length of a gear or a portion of a gear.

FIG. 24 shows leaf portions 2392 and 2394 of the gears 2320 and 2340, respectively. As an example, the leaf portions 2392 and/or 2394 can include one or more magnets. In such an example, the one or more magnets can include at least one magnet that includes a plurality of north poles and a plurality of south poles. As an example, a receptacle of a housing can include one or more magnets where such one or more magnets may couple via magnetic force with one or more magnets of a leaf portion such as, for example, one or more of the leaf portions 2392 and 2394.

As mentioned, portions of a gear can include a clockwise portion and a counter-clockwise portion, a clockwise portion and a clockwise portion and/or a counter-clockwise portion and a counter-clockwise portion. As an example, each portion may be of approximately the same axial length (e.g., along an axle axis). As an example, axial lengths of portions may differ. As an example, number of teeth or segments may differ. As an example, number of grooves may differ. As an example, an assembly may include more than one type of gear.

As an example, an assembly can include spacers and worm, face gear "paradoxical" gears with elliptical shapes. In such an example, the assembly may include a first housing and a second housing with different thicknesses. In such an example, worm gears may mesh (e.g., optionally via synchronized motion). As an example, worm gears may include relatively smooth profiles, which may, for example, reduce risk of finger pinch, marring/gouging a surface (e.g., a desk surface), catching clothing (e.g., grabbing a stocking from device placed on a leg or legs), etc. As an example, a left hand elliptic worm with an adjacent right hand elliptical worm in combination (e.g., optionally with a spacer between) may allow for synchronous opening/closing and enforcement of a no-slip condition. As an example, multiple gearing pairs may act to balance (e.g., share) torque load during movement of one housing with respect to another or movement of housings (e.g., synchronously). As an example, a hinge assembly may include gears whereby the gears provide for synchronous movement of latches (e.g., latch portions). In such an example, where housings are operatively coupled to the latches, the housings may be moved synchronously.

As an example, a magnetic hinge assembly can be attachable and detachable, optionally without use of screws, bolts, etc. For example, a magnetic hinge assembly can be attachable and detachable from one or more housings via magnet force and by applying force to overcome the magnetic force.

As an example, a magnetic hinge assembly may optionally include one or more electrical magnets where a coil, etc., may be energized to generate a magnetic field. As an example, such a field may oppose a permanent magnetic field, which may assist with detaching a leaf from a receptacle. For example, consider a button that causes a coil to be energized such that detachment of a leaf from a receptacle of a housing is facilitated. As an example, a coil may be disposed on and/or within a magnet. In such an example, energy can be at a level that is below a level that would cause heating of the magnet to its Curie temperature.

As an example, magnets can provide for self-alignment. As an example, magnets may provide attraction force that may be tailored for a system, a user, a function or functions, etc. As an example, positive contact force between magnets may be utilized to form one or more contacts (e.g., to transmit power, information, etc.).

As an example, a magnetic hinge assembly may be configured in a manner that is water resistant or waterproof. For example, a receptacle can be a surface receptacle, a recessed receptacle, etc. where magnetic coupling can be achieved where the receptacle is water resistant or waterproof. Such an approach may be utilized, for example, for an underwater device (e.g., an underwater computing device, an underwater camera, etc.).

As an example, an apparatus can include a processor; memory accessible by the processor; and a housing that includes a movable receptacle component that transitions from a first positional state to a second positional state responsive to a magnetic field. In such an example, the movable receptacle component, in the first positional state, can include a surface positioned approximately evenly with an exterior surface of the housing. As an example, in the second positional state, the surface can be recessed from the exterior surface of the housing (see, e.g., FIG. 20) or, for example, the surface can positioned exteriorly a distance from the exterior surface of the housing (see, e.g., FIG. 19).

As an example, a movable receptacle component can include at least one magnet. As an example, a movable receptacle component can be a receptacle body that includes at least one opening that can receive a leaf, a connector (e.g., a plug), etc. As an example, a movable receptacle component can be a cover. As an example, a cover may be made at least in part of a material from which an exterior surface of a housing is made. In such an example, the cover may match the exterior surface of the housing (e.g., as to color, texture, etc.).

As an example, an apparatus can include a processor; memory accessible by the processor; a housing that includes a movable receptacle component that transitions from a first positional state to a second positional state responsive to a magnetic field and a connector where the connector is inaccessible for connection in the first positional state of the receptacle component and accessible for connection in the second positional state of the receptacle component. In such an example, the apparatus can include a magnet that includes a magnetic pattern of a plurality of north poles and a plurality of south poles that align an external connector with the connector where the external connector includes a corresponding magnetic pattern. In such an example, the connector and the external connector may include electrical contacts and/or fiber optic contacts or other type of optical contacts. As an example, connectors may establish electrical and/or optical connections. As an example, connectors may transmit power and/or information. As an example, magnets can include magnetic patterns that act to align contacts of one connector with contacts of another connector. As an example, magnets can include magnetic patterns that act to align optical connectors in a manner where a gap exists through which optical energy (e.g., electromagnetic light energy, etc.) may be transmitted.

An apparatus can include a processor; memory accessible by the processor; a display operatively coupled to the processor; a hinge assembly that includes an axle and leaves where at least one of the leaves includes a leaf magnet that includes north poles and south poles; and a first housing and a second housing that include leaf receptacles that, in a coupled state, receive the leaves of the hinge assembly to pivotably couple the first housing and the second housing. In such an example, the hinge assembly can include two leaves.

As an example, such a hinge assembly may be a center hinge assembly or one of a plurality of hinge assemblies. As an example, a first housing can include one leaf receptacle and a second housing can include one leaf receptacle. In such an example, a hinge assembly may operatively couple the housings where, for example, the hinge assembly can include leaves that can be received by the leaf receptacles.

As an example, a receptacle of a housing can be a chamber. As an example, such a chamber can include an open side or an openable side that can receive a leaf. As an example, a receptacle of a housing can be a partially open chamber, for example, with one or more open sides. As an example, a receptacle may be a recess in a surface of a housing. As an example, a receptacle may be a recess in a housing with five closed sides and one open or openable side that can receive a leaf, a plug, etc. As an example, a receptacle may be a recess in a housing with two open sides. As an example, a housing can include a surface where a magnet or magnets are disposed interiorly to the surface within the housing. As an example, such a surface may be a locating surface for receipt of a leaf, a plug, etc. As an example, a surface of a housing or a receptacle can include one or more connectors, which may be, for example, one or more electrical connectors and/or one or more optical connectors.

As an example, an apparatus can include at least one leaf receptacle that moves responsive to magnetic force of, for example, a leaf magnet. As an example, such a leaf receptacle may be a pop-up leaf receptacle that may automatically pop-up responsive to the presence of a leaf magnet. As an example, an apparatus can include a receptacle cover that moves responsive to magnetic force of a leaf magnet. In such an example, the receptacle cover may retract to a recessed position responsive to the presence of a leaf magnet.

As an example, an apparatus can include a state transition mechanism, which may optionally be a damping mechanism. For example, consider a state transition damping mechanism that includes magnets such a spring magnets (see, e.g., FIG. 9). As an example, a state transition mechanism can include at least one spring, for example, to control a retractable receptacle, a retractable cover, movement of a leaf, movement of a leaf magnet, etc. As an example, such an arrangement may create a spring magnetic where reducing the distance increases repulsion more than attraction and where increasing the distance increases attraction more than repulsion where, for example, at a sufficiently large distance, both attraction and repulsion may be minimal (e.g., effectively canceling, etc.).

As an example, a state transition damping mechanism can include a viscous element (e.g., a dashpot). As an example, consider a piston that is disposed in a piston housing that includes fluid (e.g., liquid, gas, etc.).

As an example, a state transition mechanism can include a current coil, for example, to generate an electromagnetic field. In such an example, the generated field may be used to facilitate release, weaken attraction temporarily, etc.

As an example, a damping mechanism can be operatively coupled to a leaf magnet, for example, a leaf attached to a spring where magnetic force during coupling overcomes the spring force. As an example, a damping mechanism may be operatively coupled to at least one of receptacle, for example, consider a retractable receptacle attached to a spring.

As an example, a housing can include a receptacle brush that cleans a leaf magnet, for example, to keep debris out of a receptacle. In such an example, brush fibers or material may extend in a manner to sweep a surface of a leaf or surfaces of a leaf.

As an example, a leaf magnet can include a leaf magnet coating that reduces sliding friction with respect to ferromagnetic material such as, for example, ferromagnetic debris or other types of debris.

As an example, a leaf receptacle can include a ferromagnetic material (e.g., iron, etc.).

As an example, north poles and south poles of a leaf magnet can be arranged to form boundary poles and interior poles. As an example, poles may form patterns (e.g., magnetic patterns or magnetic field patterns). As an example, consider a pattern that is an array, which may be, for example, a circular, oval, etc. or, for example, rectangular such as a checkerboard pattern. As an example, an array may be a one-dimensional array (e.g., a vector), a two-dimensional array or a three-dimensional array.

As an example, at least a portion of north poles and at least a portion of south poles of a leaf magnet may define an alignment pattern. In such an example, a leaf receptacle can include a leaf receptacle magnet that includes north poles and south poles that correspond to the alignment pattern of the leaf magnet. For example, corresponding poles can be of opposite polarity (e.g., where a north pole has a corresponding south pole and where a south pole has a corresponding north pole). Such an approach can provide for alignment of components, which may, for example, include connectors.

As an example, a housing can include a leaf receptacle magnet where north poles and south poles of a leaf magnet attract and repel the leaf receptacle magnet to form an inter-magnet gap. In such an example, the gap may avoid magnet to magnet contact, which may, for example, act to reduce wear. As an example, consider the plot 930 of FIG. 9 where a composite force is based in part on an attractive force and based in part on a repulsive force, which may, for example, balance at a distance, which may be an inter-magnetic gap distance.

As an example, in a coupled state, a first housing can be operatively coupled to a hinge assembly via magnetic force or a second housing can be operatively coupled to the hinge assembly via magnetic force. As an example, in a coupled state, a first housing and a second housing can be operatively coupled to a hinge assembly via magnetic force.

As an example, a first housing can include a front side and a back side and a second housing can include a front side and a back side where a hinge assembly pivotably couples the first housing and the second housing in a selectable one of two orientations of the first housing with respect to the second housing.

As an example, a hinge assembly can include an axel. As an example, a hinge assembly can include at least two axles and at least one set of gears.

As an example, an apparatus can include housings and a hinge assembly where the hinge assembly includes leaves where each of two of the leaves includes a respective leaf magnet that includes north poles and south poles where, in a coupled state of housings to the hinge assembly, magnetic coupling forces are at least two times the gravity force of a heavier of the housings. For example, the housings can include a first housing and a second housing where a heavier one of the housings may be the first housing or the second housing. As an example, the magnetic coupling forces can be at least about three times the gravity force of the heavier of the first housing and the second housing.

As an example, a housing can include a moveable electrical connector that, in a coupled state of a leaf of a hinge assembly to the housing, forms an electrical connection via the hinge assembly. As an example, a movable electrical connector can be or include a power connector and/or an information transmission connector.

As an example, a housing can include a moveable optical connector that, in a coupled state of a leaf of a hinge assembly to the housing, forms an optical connection via the hinge assembly.

As an example, a method can include applying magnetic force to pivotably couple a first housing to a second housing via a hinge assembly where the hinge assembly includes an axle and leaves where at least one of the leaves includes a leaf magnet that includes north poles and south poles and where the first housing and the second housing include leaf receptacles that receive the leaves of the hinge assembly. In such an example, the leaf receptacles can include magnets and/or ferromagnetic material.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 25:
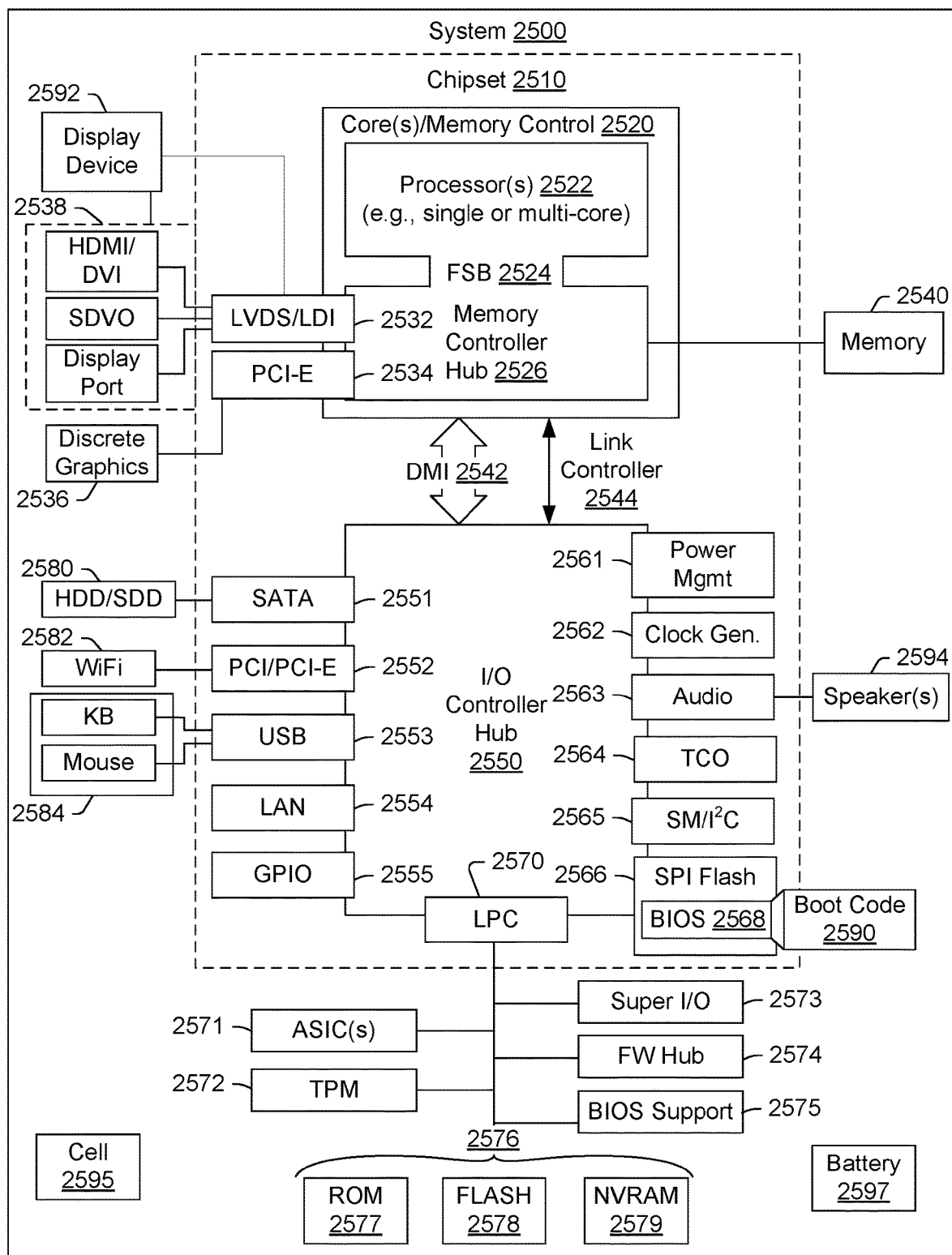
FIG. 25 is a diagram of an example of a system that includes one or more processors.

While various examples of circuits or circuitry have been discussed, FIG. 25 depicts a block diagram of an illustrative computer system 2500. The system 2500 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 2500. As an example, a system such as the system 100 of FIG. 1 may include at least some of the features of the system 2500.

As shown in FIG. 25, the system 2500 includes a so-called chipset 2510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 25, the chipset 2510 has a particular architecture, which may vary to some extent depending on brand or manufacturer. The architecture of the chipset 2510 includes a core and memory control group 2520 and an I/O controller hub 2550 that exchange information (e.g., data, signals, commands, etc.) via, for example, a direct management interface or direct media interface (DMI) 2542 or a link controller 2544. In the example of FIG. 25, the DMI 2542 is a chip-to-chip interface (sometimes referred to as being a link between a "northbridge" and a "southbridge").

The core and memory control group 2520 include one or more processors 2522 (e.g., single core or multi-core) and a memory controller hub 2526 that exchange information via a front side bus (FSB) 2524. As described herein, various components of the core and memory control group 2520 may be integrated onto a single processor die, for example, to make a chip that supplants the conventional "northbridge" style architecture.

The memory controller hub 2526 interfaces with memory 2540. For example, the memory controller hub 2526 may provide support for DDR SDRAM memory (e.g., DDR, DDR2, DDR3, etc.). In general, the memory 2540 is a type of random-access memory (RAM). It is often referred to as "system memory".

The memory controller hub 2526 further includes a low-voltage differential signaling interface (LVDS) 2532. The LVDS 2532 may be a so-called LVDS Display Interface (LDI) for support of a display device 2592 (e.g., a CRT, a flat panel, a projector, etc.). A block 2538 includes some examples of technologies that may be supported via the LVDS interface 2532 (e.g., serial digital video, HDMI/DVI, display port). The memory controller hub 2526 also includes one or more PCI-express interfaces (PCI-E) 2534, for example, for support of discrete graphics 2536. Discrete graphics using a PCI-E interface has become an alternative approach to an accelerated graphics port (AGP). For example, the memory controller hub 2526 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2550 includes a variety of interfaces. The example of FIG. 25 includes a SATA interface 2551, one or more PCI-E interfaces 2552 (optionally one or more legacy PCI interfaces), one or more USB interfaces 2553, a LAN interface 2554 (more generally a network interface), a general purpose I/O interface (GPIO) 2555, a low-pin count (LPC) interface 2570, a power management interface 2561, a clock generator interface 2562, an audio interface 2563 (e.g., for speakers 2594), a total cost of operation (TCO) interface 2564, a system management bus interface (e.g., a multi-master serial computer bus interface) 2565, and a serial peripheral flash memory/controller interface (SPI Flash) 2566, which, in the example of FIG. 25, includes BIOS 2568 and boot code 2590. With respect to network connections, the I/O hub controller 2550 may include integrated gigabit Ethernet controller lines multiplexed with a PCI-E interface port. Other network features may operate independent of a PCI-E interface.

The interfaces of the I/O hub controller 2550 provide for communication with various devices, networks, etc. For example, the SATA interface 2551 provides for reading, writing or reading and writing information on one or more drives 2580 such as HDDs, SDDs or a combination thereof. The I/O hub controller 2550 may also include an advanced host controller interface (AHCI) to support one or more drives 2580. The PCI-E interface 2552 allows for wireless connections 2582 to devices, networks, etc. The USB interface 2553 provides for input devices 2584 such as keyboards (KB), one or more optical sensors, mice and various other devices (e.g., microphones, cameras, phones, storage, media players, etc.). On or more other types of sensors may optionally rely on the USB interface 2553 or another interface (e.g., I²C, etc.). As to microphones, the system 2500 of FIG. 25 may include hardware (e.g., audio card) appropriately configured for receipt of sound (e.g., user voice, ambient sound, etc.).

In the example of FIG. 25, the LPC interface 2570 provides for use of one or more ASICs 2571, a trusted platform module (TPM) 2572, a super I/O 2573, a firmware hub 2574, BIOS support 2575 as well as various types of memory 2576 such as ROM 2577, Flash 2578, and non-volatile RAM (NVRAM) 2579. With respect to the TPM 2572, this module may be in the form of a chip that can be used to authenticate software and hardware devices. For example, a TPM may be capable of performing platform authentication and may be used to verify that a system seeking access is the expected system.

The system 2500, upon power on, may be configured to execute boot code 2590 for the BIOS 2568, as stored within the SPI Flash 2566, and thereafter processes data under the control of one or more operating systems and application software (e.g., stored in system memory 2540). An operating system may be stored in any of a variety of locations and accessed, for example, according to instructions of the BIOS 2568. Again, as described herein, a satellite, a base, a server or other machine may include fewer or more features than shown in the system 2500 of FIG. 25. Further, the system 2500 of FIG. 25 is shown as optionally include cell phone circuitry 2595, which may include GSM, CDMA, etc., types of circuitry configured for coordinated operation with one or more of the other features of the system 2500. Also shown in FIG. 25 is battery circuitry 2597, which may provide one or more battery, power, etc., associated features (e.g., optionally to instruct one or more other components of the system 2500). As an example, a SMBus may be operable via a LPC (see, e.g., the LPC interface 2570), via an I²C interface (see, e.g., the SM/I²C interface 2565), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising: a processor; memory accessible by the processor; a display operatively coupled to the processor; a hinge assembly that comprises an axle, a barrel and leaves, wherein the axle is received at least in part by the barrel and defines an axis, wherein each of the leaves comprises an axis end and an opposing end, wherein at least one of the leaves comprises a leaf magnet at its opposing end that comprises north poles and south poles; and a first housing and a second housing that comprise leaf receptacles for receipt of the leaves of the hinge assembly to pivotably couple the first housing and the second housing for rotation about the axis to a plurality of different use angles between the first housing and the second housing with respect to the axis, and wherein at least one of the leaf receptacles comprises a retractable cover, movable responsive to translation of one of the leaves, between a first position in one of the first housing and the second housing approximately even with an exterior surface of the one of the first housing and the second housing and a second position in the one of the first housing and the second housing disposed between a leaf receptacle wall and a surface of the one of the leaves, wherein the retractable cover remains in the one of the first housing or the second housing.

2. The apparatus of claim 1 wherein the hinge assembly comprises two leaves.

3. The apparatus of claim 2 wherein the first housing comprises one leaf receptacle and wherein the second housing comprises one leaf receptacle.

4. The apparatus of claim 1 wherein the retractable cover moves responsive to magnetic force of the leaf magnet of the one of the leaves.

5. The apparatus of claim 1 wherein the north poles and the south poles of the leaf magnet form at least a portion of a spring magnet.

6. The apparatus of claim 1 wherein at least one of the leaf receptacles comprises a ferromagnetic material.

7. The apparatus of claim 1 wherein the north poles and the south poles of the leaf magnet are arranged to from boundary poles and interior poles.

8. The apparatus of claim 1 wherein at least a portion of the north poles and at least a portion of the south poles of the leaf magnet form an array.

9. The apparatus of claim 1 wherein at least a portion of the north poles and at least a portion of the south poles of the leaf magnet define an alignment pattern.

10. The apparatus of claim 9 wherein at least one of the leaf receptacles comprises a leaf receptacle magnet that comprises north poles and south poles that correspond to the alignment pattern of the leaf magnet.

11. The apparatus of claim 1 wherein at least one of the leaf receptacles comprises a leaf receptacle magnet.

12. The apparatus of claim 11 wherein the north poles and the south poles of the leaf magnet attract and repel the leaf receptacle magnet to form an inter-magnet gap.

13. The apparatus of claim 1 wherein the first housing comprises a front side and a back side, wherein the second housing comprises a front side and a back side and wherein the hinge assembly pivotably couples the first housing and the second housing in a selectable one of two orientations of the first housing with respect to the second housing.

14. The apparatus of claim 1, wherein the retractable cover comprises a magnet.

15. The apparatus of claim 14, wherein a magnetic field of the leaf magnet of the one of the leaves interacts with a magnetic field of the magnet of the retractable cover.

16. The apparatus of claim 14, wherein a magnetic field of the leaf magnet of the one of the leaves repels a magnetic field of the magnet of the retractable cover.

17. The apparatus of claim 1, comprising a spring, wherein the retractable cover is operatively coupled to the spring.

18. The apparatus of claim 17, wherein, in the second position, the spring is compressed between the leaf receptacle wall and the retractable cover.

19. The apparatus of claim 18, wherein the leaf magnet of the one of the leaves generates a magnetic force that is greater than a spring force of the spring.

20. The apparatus of claim 1, wherein the leaf receptacle wall is a leaf receptacle end wall and wherein the surface is the opposing end of the one of the leaves.

21. The apparatus of claim 20, wherein the leaf receptacle end wall comprises at least one magnet that establishes a magnetic attraction force with the one of the leaves and wherein the retractable cover comprises at least one magnet that establishes a magnetic repulsion force with the one of the leaves.

\* \* \* \* \*